US012802316B2

(12) United States Patent
Persson et al.

(10) Patent No.: US 12,802,316 B2
(45) Date of Patent: Nov. 17, 2026

(54) DETERMINING A CONFIDENCE INDICATION FOR DEEP LEARNING IMAGE RECONSTRUCTION IN COMPUTED TOMOGRAPHY

(71) Applicant: Prismatic Sensors AB, Stockholm (SE)

(72) Inventors: Mats Persson, Västerhaninge (SE); Alma Equizabal, Stockholm (SE); Mats Danielsson, Täby (SE)

(73) Assignee: GE Precision Healthcare LLC, Wauwatosa, WI (US)

( * ) Notice: Subject to any disclaimer, the term of this patent is extended or adjusted under 35 U.S.C. 154(b) by 445 days.

(21) Appl. No.: 18/555,498

(22) PCT Filed: Apr. 6, 2022

(86) PCT No.: PCT/SE2022/050344
§ 371 (c)(1),
(2) Date: Oct. 13, 2023

(87) PCT Pub. No.: WO2022/220721
PCT Pub. Date: Oct. 20, 2022

(65) Prior Publication Data

US 2024/0193827 A1 Jun. 13, 2024

Related U.S. Application Data

(60) Provisional application No. 63/174,164, filed on Apr. 13, 2021.

(51) Int. Cl.
*G06T 12/20* (2026.01)
*G06T 12/30* (2026.01)

(52) U.S. Cl.
CPC .............. *G06T 12/20* (2026.01); *G06T 12/30* (2026.01); *G06T 2211/441* (2023.08)

(58) Field of Classification Search
CPC ... G06T 12/20; G06T 12/30; G06T 2211/441; G06T 11/005; G06T 2211/408;
(Continued)

(56) References Cited

U.S. PATENT DOCUMENTS 9,870,628 B2 1/2018 Gronberg
2004/0264628 A1 12/2004 Besson
(Continued)

FOREIGN PATENT DOCUMENTS

EP 3789963 A1 3/2021

OTHER PUBLICATIONS

Edupuganti et al, "Uncertainty Quantification in Deep MRI Reconstruction," in IEEE Transactions on Medical Imaging, vol. 40, No. 1, pp. 239-250, Jan. 2021, doi: 10.1109/TMI.2020.3025065, 10 pages.

(Continued)

*Primary Examiner* — Christopher Wait

(57) ABSTRACT

There is provided a method and system for determining one or more confidence indications for machine learning image reconstruction in Computed Tomography, CT. The method comprises acquiring (S1) energy-resolved x-ray data, and processing (S2) the energy-resolved x-ray data based on at least one machine learning system to generate a representation of a posterior probability distribution of at least one reconstructed basis image or image feature thereof. The method further comprises generating (S3) one or more confidence indications for: the at least one reconstructed basis image, or at least one derivative image originating from the at least one reconstructed basis image, or image feature of the at least one reconstructed basis image or the at least one derivative image, based on the representation of a posterior probability distribution.

23 Claims, 17 Drawing Sheets

(58) Field of Classification Search
CPC ........ G06N 3/0455; G06N 3/047; G06N 3/08; G01N 2223/401; G01N 2223/419; G01N 2223/423; G01N 23/046; A61B 6/482; A61B 6/5211; A61B 6/032
See application file for complete search history.

(56) References Cited

U.S. PATENT DOCUMENTS

| | | | | |
|---|---|---|---|---|
| 2008/0095305 | A1* | 4/2008 | Ziegler .................. | A61B 6/032 378/8 |
| 2015/0371378 | A1 | 12/2015 | Schmidt | |
| 2016/0120493 | A1 | 5/2016 | Maeda | |
| 2017/0270692 | A1* | 9/2017 | Gronberg ............. | A61B 6/5241 |
| 2018/0042564 | A1 | 2/2018 | Zhou | |
| 2019/0325620 | A1* | 10/2019 | Adler ........................ | G06T 7/10 |
| 2019/0340754 | A1 | 11/2019 | Honkala | |
| 2020/0027252 | A1 | 1/2020 | Ye | |
| 2020/0196972 | A1 | 6/2020 | Zhou | |
| 2020/0196973 | A1 | 6/2020 | Zhou | |

OTHER PUBLICATIONS

International Application PCT/SE2022/050344 filed Apr. 6, 2022—International Search Report and Written Opinion issued Apr. 5, 2022; 13 pages.
EP application 22788538.1 filed Nov. 13, 2023—extended Search Report issued Jan. 15, 2025; 9 pages.
Hemsley Matt et al. "Deep Generative Model for Synthetic-CT Generation with Uncertainty Predictions" Sep. 29, 2020. pp. 834-844.

* cited by examiner

DETERMINING A CONFIDENCE INDICATION FOR DEEP LEARNING IMAGE RECONSTRUCTION IN COMPUTED TOMOGRAPHY

CROSS-REFERENCE TO RELATED APPLICATION

The present application is a national stage application under 35 U.S.C. § 371(c) of PCT Application No. PCT/SE2022050344, filed on Apr. 6, 2022, which claims priority to U.S. Provisional Application No. 63/174,164, filed on Apr. 13, 2021, the disclosures of which are incorporated herein by reference in their entireties.

STATEMENT REGARDING FEDERALLY SPONSORED RESEARCH AND DEVELOPMENT

The project leading to this application has received funding from the European Union's Horizon 2020 research and innovation program under grant agreement No 830294.

The project leading to this application has also received funding from the European Union's Horizon 2020 research and innovation program under the Marie Sklodowska-Curie grant agreement No. 795747.

BACKGROUND

The proposed technology relates to x-ray technology and x-ray imaging and corresponding imaging reconstruction and Imaging tasks. In particular, the proposed technology relates to a method and system for determining a confidence indication for deep learning image reconstruction in Computed Tomography (CT), a method and system for generating an uncertainty map for deep learning image reconstruction in spectral CT, and corresponding image reconstruction systems and x-ray imaging systems as well as related computer programs and computer-program products.

Radiographic imaging such as x-ray imaging has been used for years in medical applications and for non-destructive testing.

Normally, an x-ray imaging system includes an x-ray source and an x-ray detector array consisting of multiple detectors comprising one or many detector elements (independent means of measuring x-ray intensity/fluence). The x-ray source emits x-rays, which pass through a subject or object to be imaged and are then registered by the detector array. Since some materials absorb a larger fraction of the x-rays than others, an image is formed of the subject or object.

A challenge for x-ray imaging detectors is to extract maximum information from the detected x-rays to provide input to an image of an object or subject where the object or subject is depicted in terms of density, composition and structure.

In a typical medical x-ray imaging system, the x-rays are produced by an x-ray tube. The energy spectrum of a typical medical x-ray tube is broad and ranges from zero up to 180 keV. The detector therefore typically detects x-rays with varying energy.

It may be useful with a brief overview of an illustrative overall x-ray imaging system with reference to FIG. 1. In this illustrative, but non-limiting, example the x-ray imaging system 100 basically comprises an x-ray source 10, an x-ray detector system 20 and an associated image processing system or device 30. in general, the x-ray detector system 20 is configured to register radiation from the x-ray source 10, which optionally has been focused by optional x-ray optics and passed an object, a subject or a part thereof. The x-ray defector system 20 is connectable to the image processing system 30 via suitable analog and read-out electronics, which is at least partly integrated in the x-ray detector system 20, to enable image processing and/or image reconstruction by the image processing system 30.

By way of example, an x-ray computed tomography (CT) system includes an x-ray source and an x-ray detector arranged in such a way that projection images of the subject or object can be acquired in different view angles covering at least 180 degrees. This is most commonly achieved by mounting the source and detector on a support that is able to rotate around the subject or object. An image containing the projections registered in the different detector elements for the different view angles is called a sinogram, in the following, a collection of projections registered in the different detector elements for different view angles will be referred to as a sinogram even if the detector is two-dimensional, making the sinogram a three-dimensional image.

A further development of x-ray imaging is energy-resolved x-ray imaging, also known as spectral x-ray imaging, where the x-ray transmission is measured for several different energy levels. This can be achieved by letting the source switch rapidly between two different emission spectra, by using two or more x-ray sources emitting different x-ray spectra, or more prominently, by using an energy-discriminating detector which measures the Incoming radiation in two or more energy levels. One example of such a detector is a multi-bin photon counting detector, where each registered photon generates a current pulse which is compared to a set of thresholds, thereby counting the number of photons incident in each of a number of energy bins.

A spectral x-ray projection measurement normally results In a projection image for each energy level. A weighted sum of these can be made to optimize the contrast-to-noise ratio (CNR) for a specified imaging task as described in Tapsovaara and Wagner, "SNR and DQE analysis of broad spectrum X-ray Imaging", Rhys. Med. Biol. 30, 519.

Another technique enabled by energy-resolved x-ray imaging is basis material decomposition. This technique utilizes the fact that all substances built up from elements with low atomic number, such as human tissue, have linear attenuation coefficients (E) whose energy dependence can be expressed, to a good approximation, as a linear combination of two basis functions:

$$\mu(E)=a_1f_1(E)+a_2f_2(E)$$

where $f_1$ and $f_2$ are basis functions and $a_1$ and $a_2$ are the corresponding basis coefficients. More, generally, $f_i$ are basis functions and $a_i$ are corresponding basis coefficients, if there is one or more element in the imaged volume with high atomic number, high enough for a K-absorption edge to be present in the energy range used for the imaging, one basis function must be added for each such element. In the field of medical imaging, such K-edge elements can typically be iodine or gadolinium, substances that are used as contrast agents.

Basis material decomposition has been described in Alvarez and Macovski, "Energy-selective reconstructions in X-ray computerised tomography", Phys. Med. Biol. 21 733. In basis material decomposition, the integral of each of the basis coefficients, $A_i=\int_\ell a_i dl$ for i=1, . . . , N where N is the number of basis functions, is inferred from the measured data in each projection ray $\ell$ from the source to a detector element. In one implementation, this is accomplished by first expressing the expected registered number of counts in each energy bin as a function of $A_i$:

$$\lambda_i = \int_{E=0}^{\infty} S_i(E)\exp\left(-\sum_{j=1}^{N} A_j f_j(E)\right) dE$$

where $\lambda_i$ is the expected number of counts in energy bin i, E is the energy, $S_i$ is a response function which depends on the spectrum shape incident on the imaged object, the quantum efficiency of the detector and the sensitivity of energy bin i to X-rays with energy E. Even though the term "energy bin" is most commonly used for photon counting detectors, this formula can also describe other energy resolving X-ray imaging systems such as multi-layer detectors, kVp switching sources or multiple source systems.

Then, the maximum likelihood method may be used to estimate $A_i$, under the assumption that the number of counts in each bin is a Poisson distributed random variable. This is accomplished by minimizing the negative log-likelihood function, e.g., see "K-edge imaging in X-ray computed tomography using multi-bin photon counting detectors", Roessi and Proksa, Phys. Med. Biol. 52 (2007), 4679-4696:

$$\hat{A}_1, \ldots, \hat{A}_N = \underset{A_1, \ldots, A_N}{\operatorname{argmin}} \sum_{i=1}^{M_b} \lambda_i(A_1, \ldots, A_N) - m_i \ln\lambda_i(A_1, \ldots, A_N)$$

where $m_i$ is the number of measured counts in energy bin i and $M_b$ is the number of energy bins.

When the resulting estimated basis coefficient line integral $\hat{A}_i$ for each projection line is arranged into an image matrix, the result is a material specific projection image, also called a basis image, for each basis i. This basis image can either be viewed directly (e.g., in projection x-ray imaging) or taken as input to a reconstruction algorithm to form maps of basis coefficients $a_i$ inside the object (e.g., in CT imaging). In either case, the result of a basis decomposition can be regarded as one or more basis image representations, such as the basis coefficient line integrals or the basis coefficients themselves.

A map of basis coefficients ¾ inside an object is referred to as a basis material image, a basis image, a material image, a material-specific image, a material map or a basis map.

However, a well-known limitation of this and other techniques is that the variance of the estimated line integrals normally increases with the number of bases used in the basis decomposition. Among other things, this results in an unfortunate trade-off between improved tissue quantification and increased image noise.

Further, accurate basis decomposition with more than two basis functions may be hard to perform in practice, and may result in artifacts, bias or excessive noise. Such a basis decomposition may also require extensive calibration measurements and data preprocessing to yield accurate results.

Due to the inherent complexity in many image reconstruction tasks, Artificial Intelligence (AI) and machine learning such as deep learning have started being used in general image reconstruction with satisfactory results, it would be desirable to be able to use $A_i$ and deep learning for x-ray imaging tasks including CT. However, a current problem in machine learning image reconstruction such as deep learning image reconstruction is its limited explainability. An image may seemingly look like it has a very low noise level but in reality, contains errors due to biases in the neural network estimator.

Accordingly, there is a need for Improved trust and/or explainability in machine learning image reconstruction such as deep-learning image reconstruction for Computed Tomography (CT).

SUMMARY

In general, it is desirable to provide improvements related to image reconstruction for x-ray imaging applications.

It is an object to provide a method for determining a confidence indication for machine learning image reconstruction such as deep-learning image reconstruction in Computed Tomography (CT).

It is a specific object to provide a method for generating an uncertainty map for machine learning image reconstruction such as deep-learning image reconstruction in spectral CT.

It is also an object to provide a system for determining a confidence indication for machine learning image reconstruction such as deep-learning image reconstruction in Computed Tomography (CT).

Another object is to provide a system for generating an uncertainty map for machine learning image reconstruction such as deep-learning image reconstruction in spectral CT.

Yet another object is to provide a corresponding image reconstruction system.

Still another object is to provide an overall x-ray Imaging system. It is a further object to provide corresponding computer programs and computer-program products.

These and other objects may be achieved by one or more embodiments of the proposed technology.

The inventors have realized that in order to be able to trust images resulting from machine learning image reconstruction such as deep-learning image reconstruction, it is highly desirable to quantify the degree of confidence or otherwise determine an indication or representation of confidence in the reconstructed image (values). This may be particularly important for photon-counting spectral CT, where it is theoretically possible to generate quantitatively accurate maps of material composition, but where the high noise level, in particular for three-basis decomposition, implies that machine learning image reconstruction such as deep-learning reconstruction methods may have to be used as an important component of the image reconstruction chain.

A basic idea of the present invention is to provide the radiologists with a confidence indication such as an uncertainty or confidence map for each image that is generated by machine learning image reconstruction such as deep-learning image reconstruction. it is appreciated that a set of training data, for example a set of measured energy-resolved x-ray datasets and a corresponding set of ground truth or reconstructed basis material maps specifically selected for training of the machine learning system such as a neural network, can be used to specify or approximate a probability distribution of one or more reconstructed basis material images. Such a distribution before a new measurement to be assessed will be referred to as a prior distribution. If furthermore one or more measurements of a representation of x-ray image data is performed, the probability distribution of possible basis material images with the additional knowledge of this measurement is known as a posterior probability distribution. According to a first aspect, there is provided a method for determining one or more confidence indications for machine-learning image reconstruction in Computed Tomography, CT, Basically, the method comprises the steps of acquiring energy-resolved x-ray data; processing the energy-resolved x-ray data based on at least one machine learning system to generate a representation of a posterior probability distribution of at least one reconstructed basis image or image feature thereof; and generating one or more confidence indications for the at least one reconstructed basis image, or at least one derivative image originating from the at least one reconstructed basis image, or image feature of said at least one reconstructed basis image or said at least one derivative image, based on the representation of a posterior probability distribution.

By way of example, the confidence indication(s) may include one or more uncertainty or confidence maps. Such uncertainty or confidence map(s) may be presented together with the associated image(s) or image feature(s) in various ways to provide a radiologist with additional useful information.

According to a second aspect, there is provided a system for determining one or more confidence indications for machine-learning image reconstruction in Computed Tomography, CT. The system is configured to acquiring energy-resolved x-ray data. The system is further configured to process the energy-resolved x-ray data based on at least one machine learning system to obtain a representation of a posterior probability distribution of at least one reconstructed basis image or image feature thereof. The system is also configured to generate one or more confidence indications for; said at least one reconstructed basis image, or at least one derivative image originating from said at least one reconstructed basis Image, or image feature of said at least one reconstructed basis Image or said at least one derivative image, based on the representation of a posterior probability distribution.

According to a third aspect, there is provided a corresponding image reconstruction system comprising such a system for determining a confidence indication. According to a fourth aspect, there is provided an overall x-ray imaging system comprising such an image reconstruction system.

According to a fifth aspect, there is provided corresponding computer programs and computer-program products.

In this way, improved trust and/or explainability in machine learning image reconstruction for Computed Tomography (CT) may be obtained.

BRIEF DESCRIPTION OF DRAWINGS

The embodiments, together with further objects and advantages thereof, may best be understood by making reference to the following description taken together with the accompanying drawings, in which.

DETAILED DESCRIPTION

For a better understanding, it may be useful to continue with an introductory description of non-limiting examples of an overall x-ray imaging system.

Figure 2:
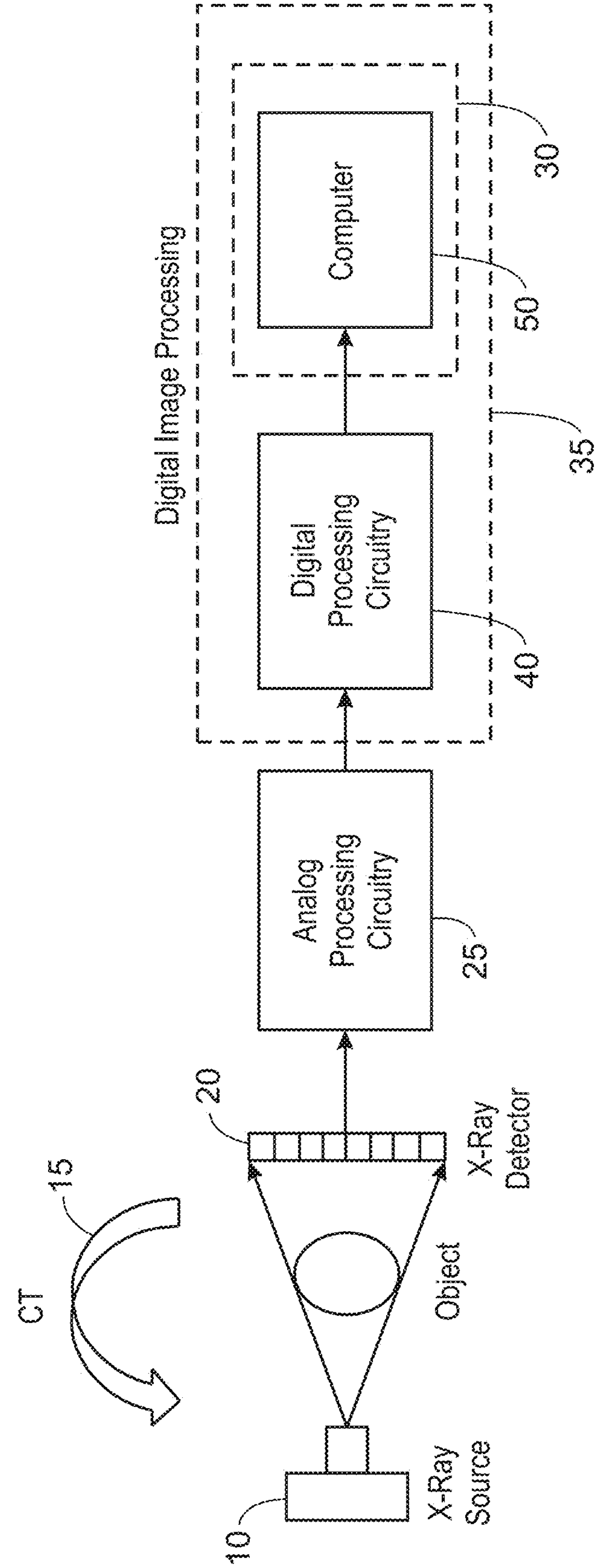
FIG. 2 is a schematic diagram illustrating another example of an x-ray imaging system.

FIG. 2 is a schematic diagram illustrating an example of an x-ray imaging system 100 comprising an x-ray source 10, which emits x-rays, an x-ray detector system 20 with an x-ray detector, which detects the x-rays after they have passed through the object, analog processing circuitry 25, which processes the raw electrical signal from the x-ray detector and digitizes it, digital processing circuitry 40, which may carry out further processing operations on the measured data, such as applying corrections, storing it temporarily, or filtering, and a computer 50, which stores the processed data and may perform further post-processing and/or image reconstruction. All or part of the analog processing circuitry 25 may be implemented in the x-ray detector system 20.

The overall x-ray detector may be regarded as the x-ray detector system 20, or the x-ray detector system 20 combined with the associated analog processing circuitry 25. The digital part including the digital processing circuitry 40 and/or the computer 50 may be regarded as the image processing system 30, which performs image reconstruction based on the image data from the x-ray detector. The image processing system 30 may be defined as the computer 50, or alternatively image processing system 35 (digital image processing) may be defined as the combined system of the digital processing circuitry 40 and the computer 50, or possibly the digital processing circuitry 40 by itself if the digital processing circuitry is further specialized also for image processing and/or reconstruction.

An example of a commonly used x-ray imaging system is an x-ray computed tomography, CT, system, which may include an x-ray tube that produces a fan or cone beam of x-rays and an opposing array of x-ray detectors measuring the fraction of x-rays that are transmitted through a patient or object. The x-ray tube and detector array are mounted In a gantry that rotates around the imaged object.

Figure 3:
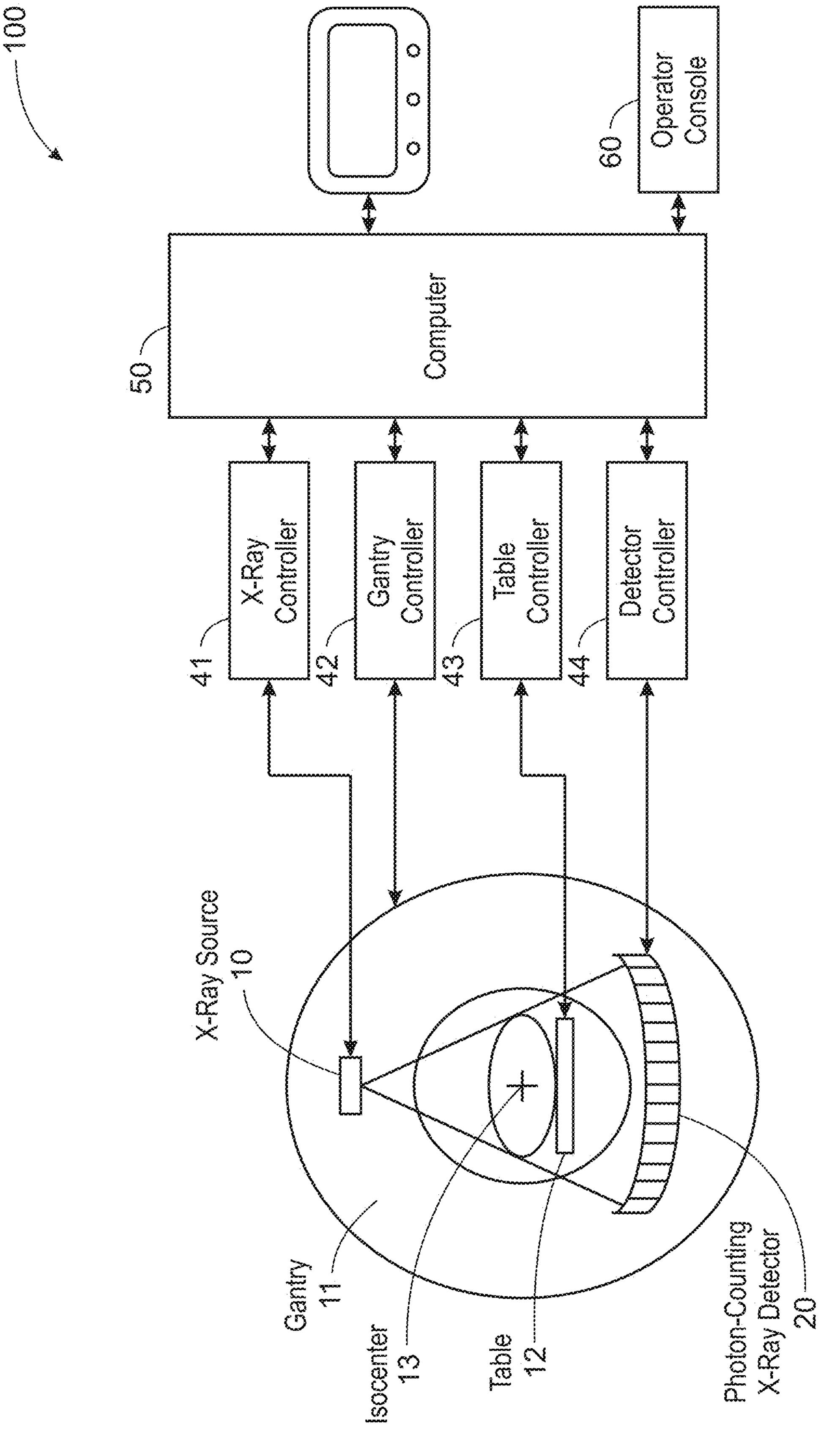
FIG. 3 is a schematic block diagram of a CT system as an illustrative example of an x-ray imaging system.

FIG. 3 is a schematic block diagram of a CT system as an illustrative example of an x-ray imaging system. The CT system comprises a computer 50 receiving commands and scanning parameters from an operator via an operator console 60 that may have a display and some form of operator interface, e.g., keyboard and mouse. The operator supplied commands and parameters are then used by the computer 50 to provide control signals to an x-ray controller 41, a gantry controller 42 and a table controller 43. To be specific, the x-ray controller 41 provides power and timing signals to the x-ray source 10 to control emission of x-rays onto the object or patient lying on the table 12. The gantry controller 42 controls the rotational speed and position of the gantry 11 comprising the x-ray source 10 and the x-ray detector 20, By way of example, the x-ray detector may be a photon counting x-ray detector. The table controller 43 controls and determines the position of the patient table 12 and the scanning coverage of the patient. There is also a detector controller 44, which is configured for controlling and/or receiving data from the detector 20.

Figure 1:
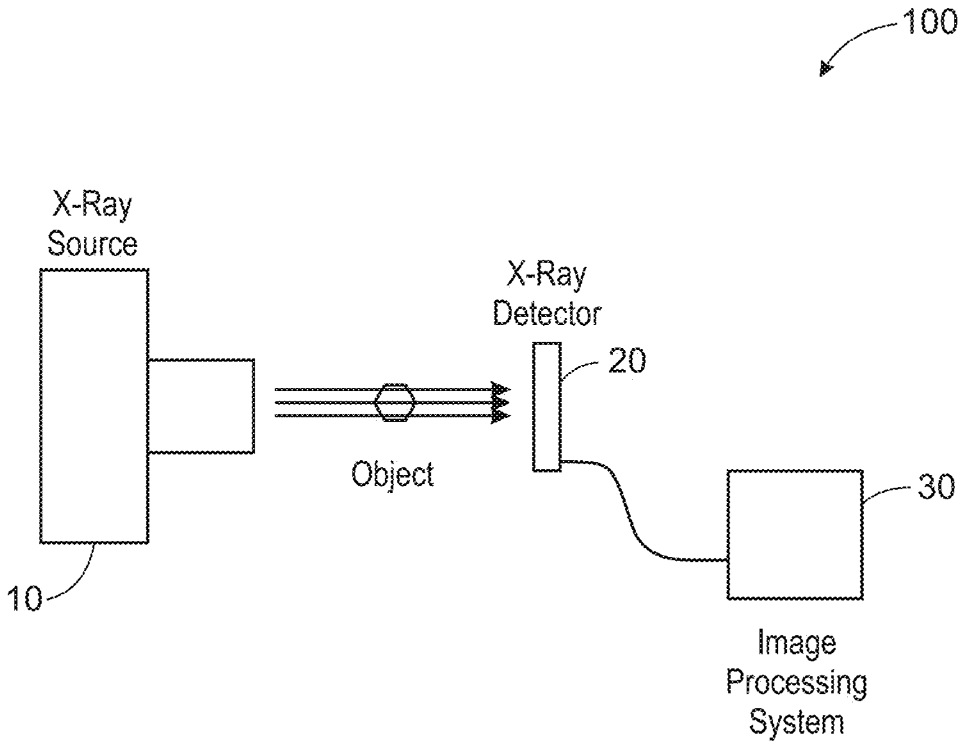
FIG. 1 is a schematic diagram illustrating an example of an overall x-ray imaging system.

In an embodiment, the computer 50 also performs post-processing and image reconstruction of the image data output from the x-ray detector The computer thereby corresponds to the image processing system 30 as shown in FIGS. 1 and 2. The associated display allows the operator to observe the reconstructed images and other data from the computer.

The x-ray source 10 arranged in the gantry 11 emits x-rays. An x-ray detector 20, e.g. in the form of a photon counting detector, detects the x-rays after they have passed through the patient. The x-ray detector 20 may for example be formed by plurality of pixels, also referred to as sensors or detector elements, and associated processing circuitry, such as ASICs, arranged in detector modules. A portion of the analog processing part may be implemented in the pixels, whereas any remaining processing part is implemented in, for instance, the ASICs. In an embodiment, the processing circuitry (ASICs) digitizes the analog signals from the pixels. The processing circuitry (ASICs) may also comprise a digital processing part, which may carry out further processing operations on the measured data, such as applying corrections, storing it temporarily, and/or filtering. During a scan to acquire x-ray projection data, the gantry and the components mounted thereon rotate about an iso-center.

Modem x-ray detectors normally need to convert the incident x-rays into electrons, this typically takes place through the photoelectric effect or through Compton interaction and the resulting electron are usually creating secondary visible light until its energy is lost and this light is in turn detected by a photo-sensitive material. There are also detectors, which are based on semiconductors and in this case the electrons created by the x-ray are creating electric charge in terms of electron-hole pairs which are collected through an applied electric field.

There are detectors operating in an energy integrating mode in the sense that they provide an integrated signal from a multitude of x-rays. The output signal is proportional to the total energy deposited by the detected x-rays.

X-ray detectors with photon counting and energy resolving capabilities are becoming common for medical x-ray applications. The photon counting defectors have an advantage since in principal the energy for each x-ray can be measured which yields additional information about the composition of the object. This information can be used to increase the image quality and/or to decrease the radiation dose.

Generally, a photon counting x-ray detector determines the energy of a photon by comparing the height of the electric pulse generated by a photon interaction in the detector materia! to a set of comparator voltages. These comparator voltages are also referred to as energy thresholds. Generally, the analog voltage in a comparator is set by a digital-to-analog converter, DAG. The DAG converts a digital setting sent by a controller to an analog voltage with respect to which the heights of the photon pulses can be compared.

A photon counting detector counts the number of photons that have interacted in the detector during a measurement time. A new photon Is generally identified by that the height of the electric pulse exceeds the comparator voltage of at least one comparator. When a photon is identified, the event is stored by incrementing a digital counter associated with the channel.

When using several different threshold values, a so-called energy-discriminating photon counting detector is obtained, in which the detected photons can be sorted into energy bins corresponding to the various threshold values. Sometimes, this type of photon counting detector is also referred to as a multi-bin detector. In general, the energy information allows for new kinds of images to be created, where new information is available and Image artifacts inherent to conventional technology can be removed. In other words, for an energy-discriminating photon counting detector, the pulse heights are compared to a number of programmable thresholds (Ti-TN) in the comparators and are classified according to pulse-height, which in turn is proportional to energy. In other words, a photon counting detector comprising more than one comparator is here referred to as a multi-bin photon counting detector. In the case of multi-bin photon counting detector, the photon counts are stored in a set of counters, typically one for each energy threshold. For example, counters can be assigned to correspond to the highest energy threshold that the photon pulse has exceeded. In another example, counters keep track of the number times that the photon pulse cross each energy threshold.

As an example, edge-on is a special, non-limiting design for a photon counting detector, where the x-ray sensors such as x-ray detector elements or pixels are oriented edge-on to incoming x-rays.

For example, such photon counting detectors may have pixels in at least two directions, wherein one of the directions of the edge-on photon counting detector has a component in the direction of the x-rays. Such an edge-on photon counting defector is sometimes referred to as a depth-segmented photon counting detector, having two or more depth segments of pixels in the direction of the incoming x-rays.

Alternatively, the pixels may be arranged as an array (non-depth-segmented) in a direction substantially orthogonal to the direction of the incident x-rays, and each of the pixels may be oriented edge-on to the incident x-rays. In other words, the photon counting detector may be non-depth-segmented, while still arranged edge-on to the incoming x-rays.

In order to increase the absorption efficiency, the edge-on photon counting detector can accordingly be arranged edge-on, in which case the absorption depth can be chosen to any length, and the edge-on photon counting detector can still be fully depleted without going to very high voltages.

A conventional mechanism to detect x-ray photons through a direct semiconductor detector basically works as follows. The energy of the x-ray interactions in the detector material are converted to electron-hole pairs inside the semiconductor defector, where the number of electron-hole pairs is generally proportional to the photon energy. The electrons and holes are drifted towards the detector electrodes and backside (or vice versa). During this drift, the electrons and holes induce an electrical current in the electrode, a current which may be measured.

Figure 4:
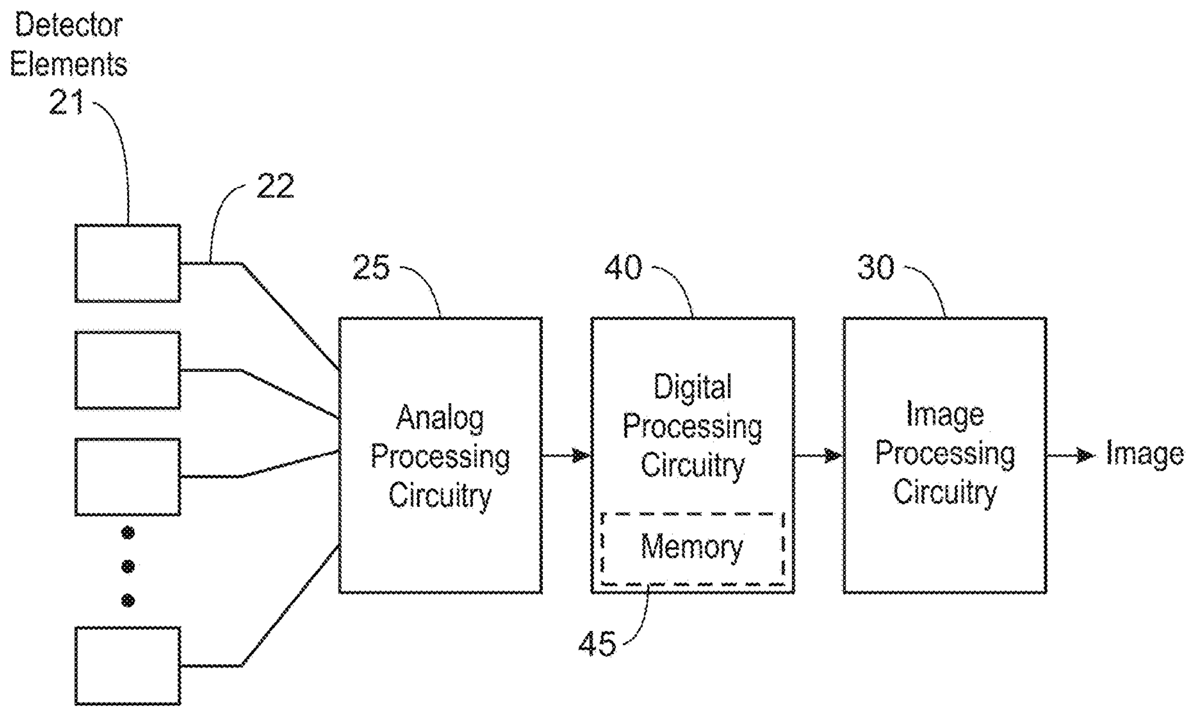
FIG. 4 is a schematic diagram illustrating another example of relevant parts of an x-ray imaging system.

As illustrated in FIG. 4, signal(s) is/are routed 27 from detector elements 21 of the x-ray detector to inputs of analog processing circuitry (e.g., ASICs) 25. It should be understood that the term Application Specific Integrated Circuit (ASIC) is to be interpreted broadly as any general circuit used and configured for a specific application. The ASIC processes the electric charge generated from each x-ray and converts it to digital data, which can be used to obtain measurement data such as a photon count and/or estimated energy. The ASICs are configured for connection to digital processing circuitry so the digital data may he sent to further digital processing circuitry 40 and/or one or more memories 45 and finally the data will be the input for image processing circuitry 30 to generate a reconstructed image.

As the number of electrons and holes from one x-ray event is proportional to the energy of the x-ray photon, the total charge in one Induced current pulse is proportional to this energy. After a filtering step in the ASIC, the pulse amplitude is proportional to the total charge in the current pulse, and therefore proportional to the x-ray energy. The pulse amplitude can then be measured by comparing its value with one or several thresholds (THR) in one or more comparators (COMP), and counters are introduced by which the number of cases when a pulse is larger than the threshold value may be recorded. In this way it is possible to count and/or record the number of x-ray photons with an energy exceeding an energy corresponding to respective threshold value (THR) which has been detected within a certain time frame.

The ASIC typically samples the analog photon pulse once every Clock Cycle and registers the output of the comparators. The comparator(s) (threshold) outputs a one or a zero depending on whether the analog signal was above or below the comparator voltage. The available information at each sample is, for example, a one or a zero for each comparator representing weather the comparator has been triggered (photon pulse was higher than the threshold) or not.

In a photon counting detector, there is typically a Photon Counting Logic which determines if a new photon has been registered and, registers the photons in counter(s). In the case of a multi-bin photon counting detector, there are typically several counters, for example one for each comparator, and the photon counts are registered in the counters in accordance with an estimate of the photon energy. The logic can be implemented in several different ways. Two of the most common categories of Photon Counting Logics are the so-called non-paralyzable counting modes, and the paralyzable counting modes. Other photon counting logics include, for example, local maxima detection, which counts, and possibly also registers the pulse height of, detected local maxima in the voltage pulse.

There are many benefits of photon counting detectors including, but not limited to: high spatial resolution; low electronic noise; energy resolution; and material separation capability (spectral imaging ability). However, energy integrating detectors have the advantage of high count-rate tolerance. The count-rate tolerance comes from the fact/recognition that, since the total energy of the photons is measured, adding one additional photon will always increase the output signal (within reasonable limits), regardless of the amount of photons that are currently being registered by the detector. This crucial advantage is one of the main reasons that energy integrating detectors are the standard for medical CT today.

Figure 5:
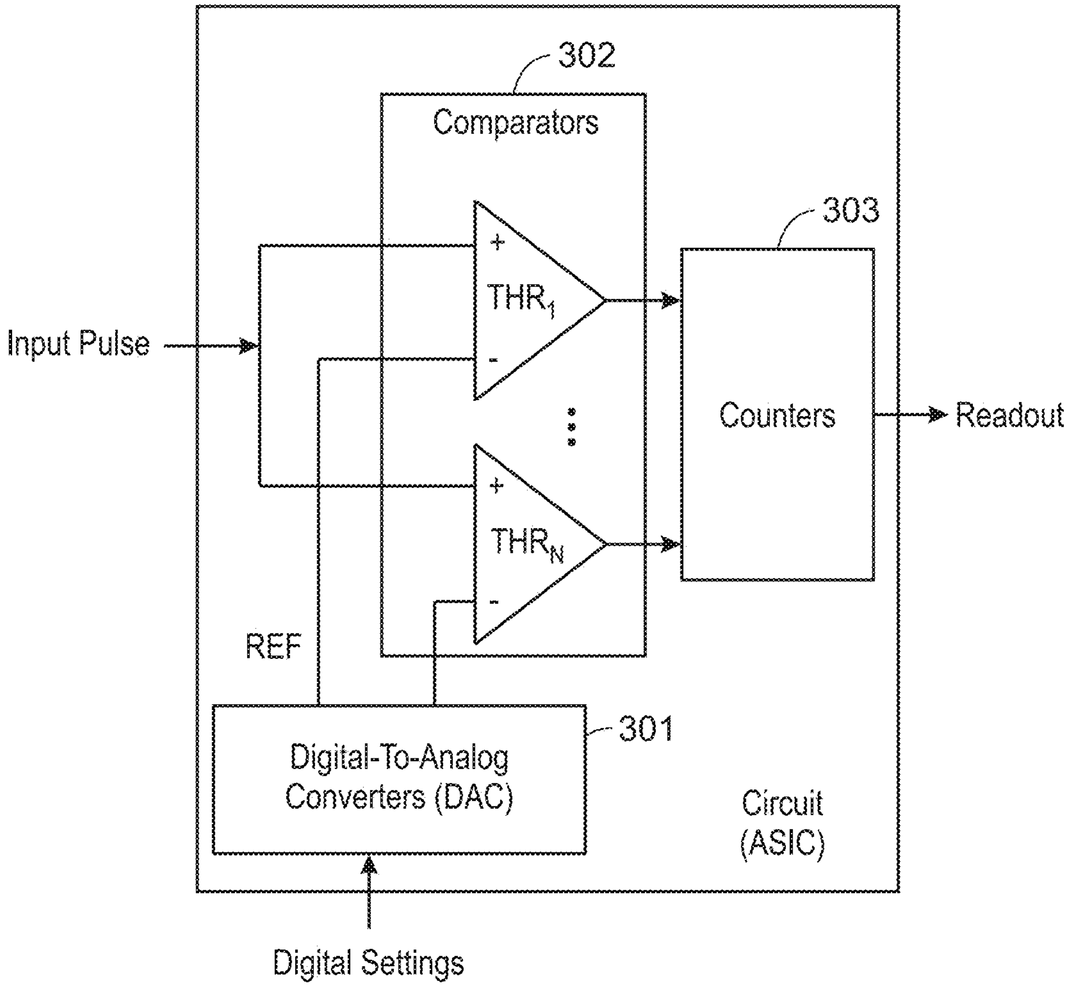
FIG. 5 is a schematic illustration of a photon counting circuit and/or device according to prior art.

For a better understanding, it may be useful to begin with a brief system overview and/or analysis of some of the technical problems. To this end, reference is made to FIG. 5, which provides a schematic illustration of a photon counting circuit and/or device according to prior art.

When a photon interacts in a semiconductor material, a cloud of electron-hole pairs is created. By applying an electric field over the detector material, the charge carriers are collected by electrodes attached to the detector material. The signal is routed from the detector elements to inputs of analog processing circuitry, e.g., ASICs. It should be understood that the term Application Specific integrated Circuit, ASIC, is to be interpreted broadly as any general circuit used and configured for a specific application. The ASIC processes the electric charge generated from each x-ray and converts it to digital data, which can be used to obtain measurement data such as a photon count and/or estimated energy, in one example, the ASIC can process the electric charge such that a voltage pulse is produced with maximum height proportional to the amount of energy deposited by the photon in the detector material.

The ASIC may include a set of comparators 302 where each comparator 302 compares the magnitude of the voltage pulse to a reference voltage. The comparator output is typically zero or one (0/1) depending on which of the two compared voltages that is larger. Here we will assume that the comparator output is one (1) if the voltage pulse is higher than the reference voltage, and zero (0) if the reference voltage is higher than the voltage pulse. Digital-to-analog converters, DAC, 301 can be used to convert digital settings, which may be supplied by the user or a control program, to reference voltages that can be used by the comparators 302. If the height of the voltage pulse exceeds the reference voltage of a specific comparator, we will refer to the comparator as triggered Each comparator is generally associated with a digital counter 303, which is incremented based on the comparator output in accordance with the photon counting logic.

In general, basis material decomposition utilizes the fact that all substances built up from elements with low atomic number, such as human tissue, have linear attenuation coefficients (E) whose energy dependence can be expressed, to a good approximation, as a linear combination of two (or more) basis functions:

$$\mu(E)=a_1f_1(E)+a_2f_2(E)$$

where $f_1$ and $f_2$ are basis functions and $a_1$ and $a_2$ are the corresponding basis coefficients. More generally, $f_1$ are the basis functions and $a_1$ are the corresponding basis coefficients. If there is one or more element in the imaged volume with high atomic number, high enough for a k-absorption edge to be present in the energy range used for the imaging, one basis function must be added for each such element. In the field of medical imaging, such k-edge elements can typically be iodine or gadolinium, substances that are used as contrast agents.

As previously mentioned, the line integral $A_i$ of each of the basis coefficients $a_i$ is inferred from the measured data in each projection ray $\ell$ from the source to a detector element. The line integral $A_i$ can be expressed as:

$$A_i=\int_\ell a_i dl \text{ for } i=1, \ldots, N$$

where N is the number of basis functions. In one implementation, basis material decomposition is accomplished by first expressing the expected registered number of counts in each energy bin as a function of $A_i$. Typically, such a function may take the form:

$$\lambda_i = \int_{E=0}^{\infty} S_i(E)\exp\left(-\sum_{j=1}^{N} A_j f_j(E)\right)dE$$

where $\lambda_i$ is the expected number of counts in energy bin i, E is the energy, $S_i$ is a response function which depends on the spectrum shape incident on the imaged object, the quantum efficiency of the detector and the sensitivity of energy bin i to x-rays with energy E. Even though the term "energy bin" is most commonly used for photon counting detectors, this formula can also describe other energy resolving x-ray imaging systems such as multi-layer detectors or kVp switching sources or multiple source systems.

Then, the maximum likelihood method may be used to estimate $A_i$ under the assumption that the number of counts in each bin is a Poisson distributed random variable. This is accomplished by minimizing the negative log-likelihood function, see Roessl and Proksa, K-edge imaging in x-ray computed tomography using multi-bin photon counting detectors, Phys. Med. Biol. 52 (2007), 4679-4696:

$$\hat{A}_1, \ldots, \hat{A}_N = \underset{A_1, \ldots, A_N}{\operatorname{argmin}} \sum_{i=1}^{M_b} \lambda_i(A_1, \ldots, A_N) - m_i \ln\lambda_i(A_1, \ldots, A_N)$$

where $m_i$ is the number of measured counts in energy bin i and $M_b$ is the number of energy bins.

From the line integral $\hat{A}_i$ a tomographic reconstruction to obtain the basis coefficients $a_i$ may be performed. This procedural step may be regarded as a separate tomographic reconstruction or may alternatively be seen as part of the overall basis decomposition.

As previously mentioned, when the resulting estimated basis coefficient line integral $\hat{A}_i$ for each projection line is arranged into an image matrix, the result is a material specific projection image, also called a basis image, for each basis i. This basis image can either be viewed directly (e.g., in projection x-ray imaging) or taken as input to a reconstruction algorithm to form maps of basis coefficients $a_i$ inside the object (e.g., in CT). In either case, the result of a basis decomposition can be regarded as one or more basis image representations, such as the basis coefficient line integrals or the basis coefficients themselves.

Within the field of x-ray imaging, a representation of image data may comprise for example a sinogram, a projection image or a reconstructed CT image. Such a representation of image data may be energy-resolved if it comprises a plurality of channels where the data in different channels is related to measured x-ray data in different energy intervals, so-called multi-channel or multi-bin energy information.

Through a process of material decomposition faking a representation of energy-resolved x-ray image data as input, a basis image representation set may be generated. Such a set is a collection of a number of basis image representations, where each basis image representation is related to the contribution of a particular basis function to the total x-ray attenuation. Such a set of basis image representations may be a set of basis sinograms, a set of reconstructed basis CT images or a set of projection images. It will be understood that "image" in this context can mean for example a two-dimensional image, a three-dimensional image or a time-resolved image series.

For example, a representation of energy-resolved x-ray image data can comprise a collection of energy bin sinograms, where each energy sinogram contains the number of counts measured in one energy bin. By taking this collection of energy bin sinograms as input to a material decomposition algorithm, a set of basis sinograms can be generated. Such basis sinograms may exemplary be taken as input to a reconstruction algorithm to generate reconstructed basis images.

In a two-basis decomposition, two basis image representations are generated, based on an approximation that the attenuation of any material in the imaged object can be expressed as the linear combination on two basis functions. In a three-basis decomposition, three basis image representations are generated, based on an approximation that the attenuation of any material in the imaged object can be expressed as the linear combination on three basis images. Similarly, a four-basis decomposition, a five-basis decomposition and similar higher-order decompositions can be defined. It is also possible to perform a one-basis decomposition, by approximating ail materials in the image object as having x-ray attenuation coefficients with similar energy-dependence up to a density scale factor.

A two-basis decomposition may for example result in a set of basis sinograms comprising a water sinogram and an iodine sinogram, corresponding to basis functions given by the linear attenuation coefficients of water and iodine, respectively. Alternatively, the basis functions may represent the attenuation of water and calcium; or calcium and iodine; or polyvinyl chloride and polyethylene, A three-basis decomposition may for example result in a set of basis sinograms comprising a water sinogram, a calcium sinogram and an iodine sinogram. Alternatively, the basis functions may represent the attenuation of water, iodine and gadolinium; or polyvinyl chloride, polyethylene and iodine.

As mentioned, Artificial Intelligence (AI) and machine learning such as deep learning have started being used in general image reconstruction with some satisfactory results. However, a current problem in machine learning image reconstruction such as deep learning image reconstruction is its limited explain ability. An image may seemingly look like it has a very low noise level but in reality, contains errors due to biases in the neural network estimator.

In general, deep learning relates to machine learning methods based on artificial neural networks or similar architectures with representation learning. Learning can be supervised, semi-supervised or unsupervised. Deep learning systems such as deep neural networks, deep belief networks, recurrent neural networks and convolutional neural networks have been applied to various technical fields including computer vision, speech recognition, natural language processing, social network filtering, machine translation, and board game programs, where they have produced results comparable to and in some cases surpassing human expert performance.

The adjective "deep" in deep learning originates from the use of multiple layers in the network. Early work showed that a linear perceptron cannot be a universal classifier, but a network with a non-polynomial activation function with one hidden layer of unbounded width can on the other hand so be. Deep learning is a modern variation which is concerned with a theoretically unlimited number of layers of bounded size, which permits practical application and optimized implementation, while retaining theoretical universality under mild conditions. In deep teaming the layers are also permitted to be heterogeneous and to deviate widely from biologically informed connectionist models, for the sake of efficiency, trainability and understandability.

The inventors have realized that there is a need for improved trust and/or explain ability in machine learning image reconstruction such as deep learning image reconstruction, especially for Computed Tomography (CT).

The proposed technology is generally applicable for providing an indication of the confidence in an image and/or image feature reconstructed based on machine learning such as neural networks and/or deep learning.

As mentioned, the inventors have realized that in order to be able to trust images resulting from machine learning image reconstruction such as deep learning image reconstruction (such as the one described above), it is highly desirable to quantify the degree of confidence or otherwise determine an indication or representation of confidence in the reconstructed image (values). This may be particularly important for photon counting spectral CT, where it is theoretically possible to generate quantitatively accurate maps of material composition, but where the high noise level, in particular for three-basis decomposition, implies that machine learning such as deep learning image reconstruction must or should be used as an important component of the image reconstruction chain.

In a sense, a basic idea is to provide the radiologists with a confidence indication such as an uncertainty map for each image or image feature that is generated by machine learning image reconstruction such as deep learning image reconstruction.

According to a first main aspect there is provided a non-limiting example of a method for determining a confidence indication for machine learning image reconstruction such as deep learning image reconstruction in Computed Tomography (CT).

Figure 6A:
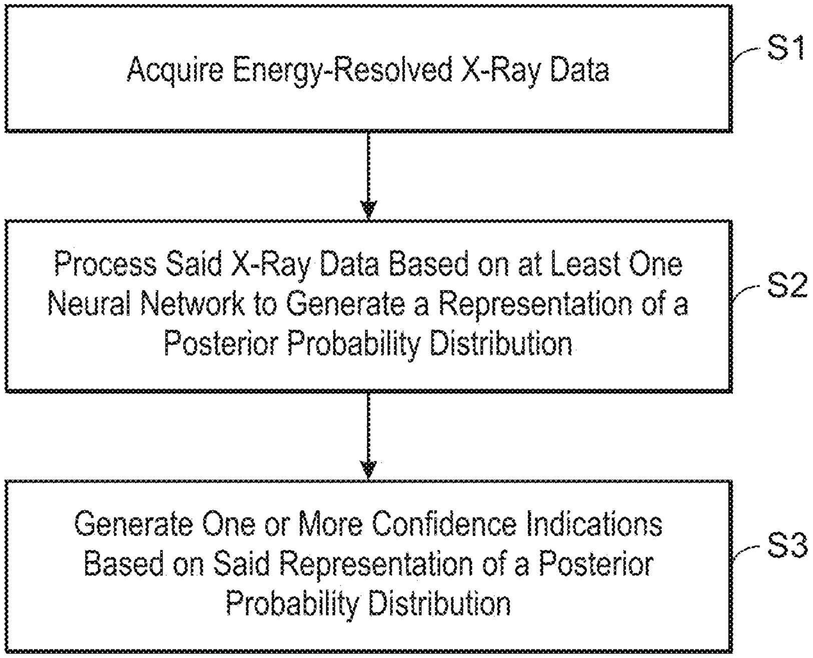
FIG. 6A is a schematic flow diagram illustrating an example of a method for determining a confidence indication for machine learning image reconstruction such as deep learning image reconstruction in Computed Tomography (CT).

FIG. 6A is a schematic flow diagram illustrating an example of a method for determining a confidence indication for machine learning image reconstruction such as deep learning image reconstruction in Computed Tomography (CT).

Basically, the method comprises the steps of acquiring (S1) energy-resolved x-ray data; processing (S2) the energy-resolved x-ray data based on at least one machine learning system, such as a neural network, to generate a representation of a posterior probability distribution of at least one reconstructed basis image or image feature thereof; and generating (S3) one or more confidence indications for the at least one reconstructed image, or at least one derivative image originating from the at least one reconstructed basis image, or image feature of the at least one reconstructed basis image or the at least one derivative image, based on the representation of a posterior probability distribution.

In other words, this can be expressed as processing energy-resolved x-ray data based on at least one neural network or similar machine learning system to obtain a representation of at least one posterior probability distribution of at least one basis image or image feature thereof. This representation can then be processed to form a confidence indication for one or more images or image features.

If is appreciated that a set of training data, for example a set of measured energy-resolved x-ray datasets and a corresponding set of ground truth or reconstructed basis material maps specifically selected for training of the machine learning system such as a neural network, can be used to specify or approximate a probability distribution of one or more reconstructed basis material images. Such a distribution before a new measurement to be assessed will be referred to as a prior distribution. If furthermore one or more measurements of a representation of x-ray image data is performed, the probability distribution of possible basis material images with the additional knowledge of this measurement is known as a posterior probability distribution.

In other words, prior information about how CT images are likely to look are typically specified by a training dataset, consisting of pairs of training input and output image data. Such input and output image data may take the form of sinograms or images with different content, such as bin images or sinograms or basis images or sinograms. By training a mapping to map the input data in each pair to output image data that is as similar as possible to the corresponding output image data in the input-output training pair, a mapping is obtained that is able to denoise, decompose into basis images or reconstruct images from the measured image data. The training output image data in each pair is also referred to as a label. In a preferred embodiment, such a mapping can take the form of a convolutional neural network (CNN) but there are also other embodiments, such as support vector machines or decision trees, that may effectuate/constitute this mapping. To find the mapping that gives the best agreement between the network output and the training output image data, a data discrepancy function, also referred to as loss function, Is normally used to calculate the data discrepancy between the network output and the training output Image data. In a preferred embodiment, the mapping may be stochastic, meaning that it gives different outputs when applied multiple times to the same input data. In this embodiment, the loss function can for example take the form of a Kullback-Leibler distance or Wasserstein distance between the distribution of output image data generated by the network and the distribution of training output image data.

By way of example, training of a convolutional neural network takes place by minimizing this data discrepancy using an optimization method, for example ADAM. Once the mapping is trained, it can be applied at runtime by mapping measured image data to produce output image data. For example, a stochastic mapping can be applied to input image data multiple times to generate an ensemble of output Image data, which can also be referred to as samples from a posterior distribution of image data given input image data. This mean and standard deviation of the output image data can then be calculated over this ensemble, whereupon the mean output, image can be used as an estimate of the denoised, decomposed or reconstructed image and the standard deviation can be used as an estimate of the uncertainty of the denoised, decomposed or reconstructed image.

In another embodiment, two separate neural networks are used, where one network is trained to generate an estimate of output image data, for example reconstructed basis images, and the second network is trained to generate an estimate of the uncertainty of the output image data, for example a map of the uncertainty of the reconstructed basis Images. For example, one way of training such networks is to first train a single stochastic neural network that generates samples from a posterior distribution of output image data as described above and then training two neural networks to predict the mean and standard deviations of the posterior distribution.

In yet another embodiment, networks that predict the mean and standard deviations of the output image data can be trained directly. This is achieved by assuming an output probability distribution parameterized by the mean and the standard deviation and minimizing a data discrepancy measure, such as the Lullback-Leibier difference or the Wasserstein difference between the output probability distribution with parameters predicted by the networks and an approximation of the posterior distribution of output image data based on the training dataset.

In yet another embodiment, a neural network estimator implemented according to one of the above methods can be trained to predict the uncertainty of a non-neural-network based CT data processing method, for example a reconstruction, decomposition or denoising method. To this end, the uncertainty of the CT data processing method can be predicted by repeated application of the method to noisy data, for example simulated or measured data, and a neural network can be trained to predict such noisy data.

In an exemplary embodiment, the energy-resolved x-ray data is acquired with a photon counting x-ray detector or obtained from an intermediate memory storing the energy-resolved x-ray data.

The fact that energy-resolved x-ray data is used means that multi-channel energy information is employed. Further, the fact that one or more basis images, also referred to as basis material images or material-specific images or material-selective images, is/are considered means that multiple materials (i.e., at least two basis materials) are involved in the overall analysis. This leads to a higher dimensionality context.

The confidence indication may be any suitable indication of the confidence of the image(s) or image feature(s) finally reconstructed by machine learning image reconstruction such as deep learning image reconstruction, e.g., a relevant quantification of the degree of confidence and/or trust in the reconstructed image(s) and/or Image feature(s). The confidence indication may also be a complex representation of confidence such as an uncertainty map, as will be exemplified in more detail later on.

An example of a confidence indication is a map showing the uncertainty of one of the basis images estimates, for example the standard deviation of the estimated iodine concentration. This will provide an image highlighting areas where there is a high uncertainty of the iodine concentration in the reconstructed iodine basis image.

Another example of a confidence indication is a confidence map, showing the degree of confidence that a certain material is present in different locations. By way of example, such a map can highlight regions where there is for sure iodine in the image while leaving regions dark if it can be the with high certainty that they do not contain iodine. Such a confidence map can for example be calculated by dividing the estimated iodine concentration by the estimated standard deviation of the iodine concentration. In another example, such a map can be calculated by computing the posterior probability that the map contains iodine at a specified location. Yet another example of a confidence indication is a confidence interval for the concentration of one or more basis materials at each point in the image.

By way of example, the machine learning image reconstruction is deep learning image reconstruction, and the at least one machine learning system includes at least one neural network.

In a particular example, the representation of a posterior probability distribution includes at least one of the following; a mean variance, a covariance, a standard deviation, a skewness, and a kurtosis.

Optionally, the one or more confidence indications may include an error estimate or measure of statistical uncertainty for at least one point in the at least one reconstructed basis image, and/or an error estimate or measure of statistical uncertainty for at least one image measurement derivable from the at least one reconstructed basis image.

For example, the error estimate or measure of statistical uncertainty may include at least one of an upper bound for an error, a lower bound for an error, a standard deviation, a variance or a mean absolute error.

As an example, the at least one image measurement may include at least one of the following a dimensional measure of a feature, an area, a volume, a degree of inhomogeneity, a measure of shape or irregularity, a measure of composition, and a measure of concentration of a substance.

As will be exemplified later on, the one or more confidence indications may include one or more uncertainty maps for the at least one reconstructed basis image, or at least, one derivative image originating from the at least one reconstructed basis image, or the image feature thereof.

In a particular example, the step S3 of generating one or more confidence indications comprises generating a confidence map for a reconstructed material-selective x-ray image for Computed Tomography, CT.

By way of example, the confidence map may be generated to highlight parts of the reconstructed material-selective x-ray image that the machine learning image reconstruction has been able to determine with a confidence level above a given threshold, i.e., with high confidence.

For example, the step S3 of generating one or more confidence indications may Include generating, by a neural network taking material concentration maps obtained from deep learning-based material decomposition as input, one or more confidence maps.

Figure 6B:
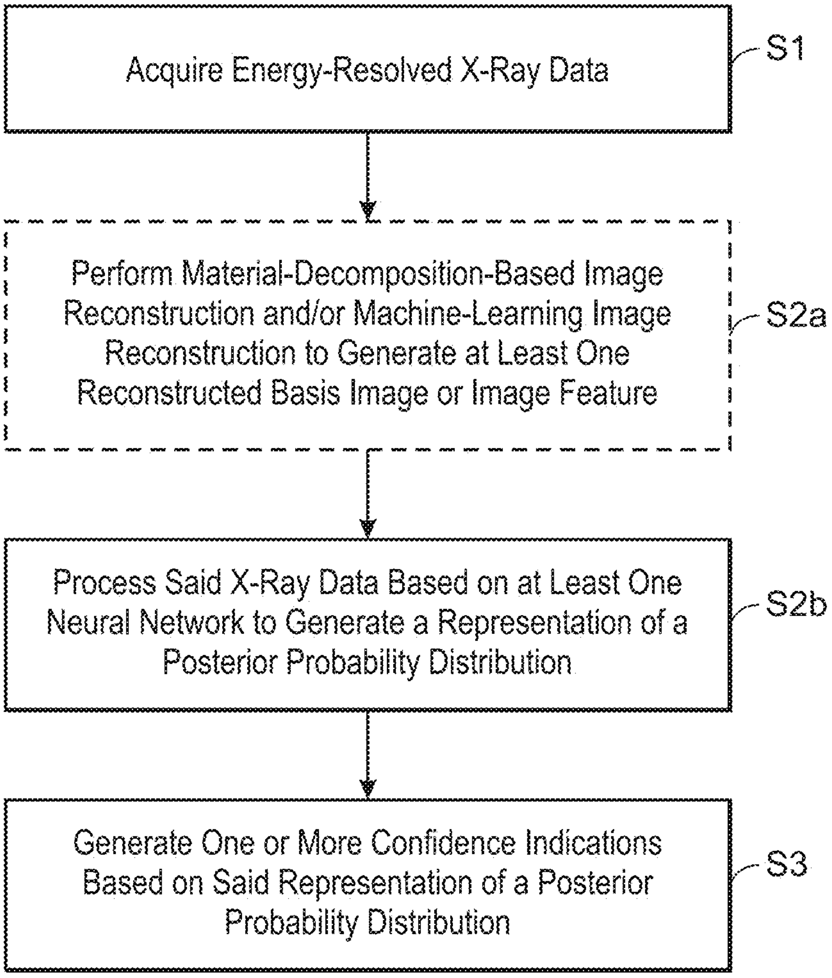
FIG. 6B is a schematic flow diagram illustrating an example of a method for determining a confidence indication for machine learning image reconstruction, additionally including performing the actual image reconstruction according to an exemplifying embodiment.

In a particular example, schematically illustrated in FIG. 6B, the method further comprises performing S2*a* material-decomposition-based image reconstruction and/or machine learning image reconstruction to generate the at least one reconstructed basis image or image feature thereof based on acquired energy-resolved x-ray data.

As an example, the step S2*a* of performing material-decomposition-based image reconstruction and/or machine learning image reconstruction may include generating, by a neural network taking energy bin sinograms as input, the at least one reconstructed basis image or image feature.

In an optional embodiment, the step of generating S3 one or more confidence indications may include determining an uncertainty or confidence map of individual basis material images and also covariance between different basis material images. This allows the uncertainty or confidence map to be propagated using a formula or algorithm for the propagation of uncertainty to yield an uncertainty map for a derived image.

In a particular example, the at least one basis material image may be generated together with at least one uncertainty map, wherein the uncertainty map is a representation of an uncertainty or error estimate of the at least one basis material image, and wherein the at least one basis material image and the at least one uncertainty map are presentable to a user as separate images/maps or in combination.

For example, the at least one uncertainty map may be presentable as an overlay relative to the at least one basis material image or the at least one uncertainty map may be presentable by means of a distorting filter for the at least one basis material image.

By way of example, the step S2 (FIG. 6A) or S2*b* (FIG. 6B) of processing the energy-resolved x-ray data based on at least one machine learning system to generate a representation of a posterior probability distribution comprises generating, by a neural network, samples of the posterior probability distribution given acquired energy-resolved x-ray data, and the step S3 of generating one or more confidence indications comprises generating an uncertainty map as the standard deviation over a plurality of samples.

In an optional embodiment, the step S2 or S2*b* of processing the energy-resolved x-ray data based on at least one machine learning system to generate a representation of a posterior probability distribution comprises applying a neural network, implemented as a variational autoencoder, to encode an input data vector into parameters of a probability distribution of a latent random variable, and extract a collection of posterior samples of the latent random variable from this probability distribution for (subsequent) processing by a corresponding decoder to obtain posterior observations.

In a particular example, the step S3 of generating one or more confidence indications comprises generating at least one map of the variance or standard deviation of at least one basis coefficient and/or at least one map of the covariance or correlation coefficient of at least one pair of basis functions associated with the at least one reconstructed basis image.

In an exemplary embodiment, the representation of a posterior probability distribution is specified by the mean and variance of a plurality of image features.

In an exemplary embodiment, the representation of a posterior probability distribution can be given by a number of Monte Carlo samples from the distribution.

In an exemplary embodiment, the neural network is a convolutional neural network (CNN) with at least five layers.

In an exemplary embodiment, the processing based on the neural network can include processing with a stochastic neural network.

In an exemplary embodiment, the neural network is configured to operate based on random dropout, noise insertion, a variational autoencoder or noisy stochastic gradient descent.

In an exemplary embodiment, the processing based on the neural network can include processing with a deterministic neural network that provides a measure of the posterior probability distribution.

In an exemplary embodiment, the processing based on the neural network can include processing with a deterministic neural network that provides a measure of uncertainty of a reconstructed image or image feature.

In an exemplary embodiment, the processing based on the neural network is based on a neural network based on one or more inputs calculated from at least one physical model of the data acquisition.

In an exemplary embodiment, the at least one Input calculated from a physical model of the data acquisition is a gradient of a data discrepancy function, an estimate of a scattered photon distribution, or a representation of crosstalk between detector pixels, or a representation of pile-up.

In an exemplary embodiment, the processing is based on a neural network comprising an unrolled optimization neural network architecture.

In an exemplary embodiment, the processing is based on a neural network that takes as input at least one standard deviation, variance or covariance maps in image space or sinogram space based on the Cramer-Rao lower bound.

In an exemplary embodiment, the processing may be based on a neural network that performs the steps of performing at least two basis material decompositions on at least one representation of energy-resolved x-ray image data, resulting in at least two original basis image representation sets; obtaining or selecting at least two basis image representations from at least two of the original basis image representation sets; and processing the obtained or selected basis image representations with data processing based on the neural network, resulting in a representation of a posterior probability distribution of a basis image representation set.

In an exemplary embodiment, the processing is based on a neural network that is trained by minimizing a loss function calculated as a discrepancy measure in image space or sinogram space between the label, i.e. the prescribed output corresponding to a network input in the training set, and the network output, where the loss function incorporates the discrepancy for at least two different basis material components.

In an exemplary embodiment, the loss function is based on a weighted mean square error, a Kullback-Leibler distance or a Wasserstein distance.

In an exemplary embodiment, the loss function incorporates least two different basis material components that are incorporated with different weight factors.

In an exemplary embodiment, the loss function is calculated based on a set of basis coefficient in a transformed basis relative to the original basis.

In an exemplary embodiment, the algorithm is trained on image data that is generated with a deliberately introduced model error. This can make a neural network estimator more robust to model errors and model uncertainties. This technique can also allow a stochastic neural network to incorporate the image uncertainty due to an unknown model error.

According to a complementary aspect, there is provided a non-limiting example of a method for generating an uncertainty map for machine learning image reconstruction such as deep learning image reconstruction in spectral CT.

Figure 7:
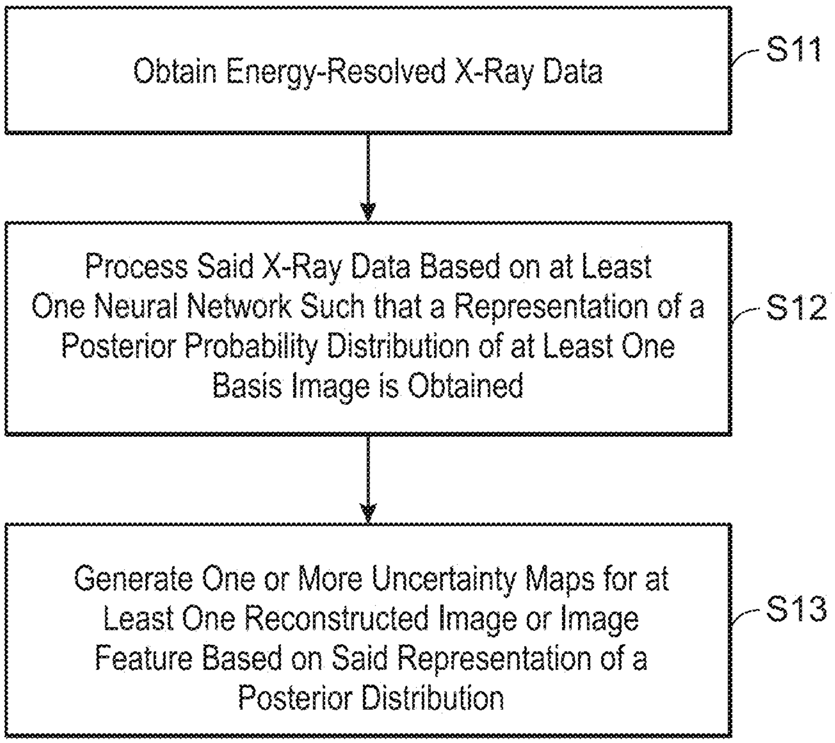
FIG. 7 is a schematic flow diagram illustrating an example of a method for generating an uncertainty map for machine learning image reconstruction such as deep learning image reconstruction in spectral CT.

FIG. 7 is a schematic flow diagram illustrating an example of a method for generating an uncertainty map for machine learning image reconstruction such as deep learning image reconstruction in spectral CT.

The method comprises steps of obtaining (S11) energy-resolved x-ray data; processing (S12) the energy-resolved x-ray data based on at least one neural network such that a representation of a posterior probability distribution of at least one reconstructed basis image or image feature thereof is obtained; and generating (S13) one or more uncertainty maps for at least one reconstructed image, or derivative image, or image feature thereof based on the representation of a posterior probability distribution.

In an exemplary embodiment, the step of generating one or more uncertainty maps comprises the step of generating a map of the variance or standard deviation of at least one basis coefficient and/or at least one map of the covariance or correlation coefficient of at least one pair of basis functions.

By way of example, the energy-resolved x-ray data may be obtained from or acquired by a photon counting x-ray detector or obtained from an intermediate memory storing the energy-resolved x-ray data.

In an exemplary embodiment, the neural network is a convolutional neural network (CNN) with at least five layers.

In an exemplary embodiment, the representation of a posterior probability distribution is specified by the mean and variance of a plurality of image features.

In an exemplary embodiment, the representation of a posterior probability distribution can be given by a number of Monte Carlo samples from the distribution.

In an exemplary embodiment, the processing based on the neural network can include processing with a stochastic neural network.

In an exemplary embodiment, the neural network is configured to operate based on random dropout, noise insertion, a variational autoencoder or noisy stochastic gradient descent.

In an exemplary embodiment, the processing based on the neural network can include processing with a deterministic neural network that provides a measure of a probability distribution.

In an exemplary embodiment, the processing based on the neural network can include processing with a deterministic neural network that provides a measure of uncertainty of a reconstructed image or image feature.

In an exemplary' embodiment, the processing based on the neural network is based on a neural network based on one or more Inputs calculated from at least one physical model of the data acquisition.

In an exemplary embodiment, the at least one input calculated from a physical model of the data acquisition is a gradient of a data discrepancy function, an estimate of a scattered photon distribution, or a representation of crosstalk between detector pixels, or a representation of pile-up.

In an exemplary embodiment, the processing is based on a neural network comprising an unrolled optimization neural network architecture.

In an exemplary embodiment, the processing is based on a neural network that takes as input at least one standard deviation, variance or covariance maps in image space or sinogram space based on the Cramer-Rao lower bound.

In an exemplary embodiment, the processing is based on a neural network that is trained by minimizing a loss function calculated as a discrepancy measure in image space or sinogram space between the label and the network output, where the loss function incorporates the discrepancy for at least two different basis material components.

In an exemplary embodiment, the loss function is based on a weighted mean square error where at least two different basis material components are incorporated with different weight factors.

In order to provide an exemplary framework for facilitating the understanding of the proposed technology, a specific example of deep learning based image reconstruction in the particular context of CT image reconstruction will now be given.

It should though be understood that the proposed technology for providing an indication of the confidence in deep learning image reconstruction in CT applications is generally applicable to deep learning based image reconstruction for CT, and not limited to the following specific example of deep learning based image reconstruction.

By way of example, the disclosure can provide a confidence map for a reconstructed material-selective x-ray CT image. Such a confidence map can highlight parts of the image that a reconstruction algorithm has been able to determine with high confidence.

Figure 8:
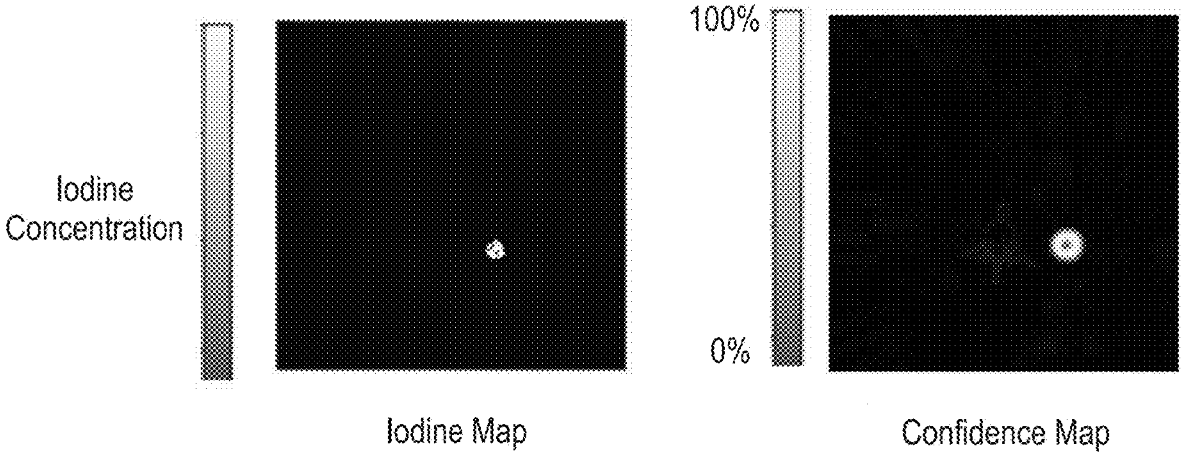
FIG. 8 is a schematic diagram illustrating an example of an uncertainty map according to an embodiment.

In particular, such an image can be provided for an image of the distribution of a contrast agent such as iodine. It is appreciated that quantifying iodine in a three-basis decomposition is highly sensitive to noise, and therefore a reconstruction algorithm such as a deep learning algorithm may need to draw heavily on prior information to obtain this image. A confidence map for the concentration of iodine is therefore useful for an observer such as a radiologist to be able to interpret the image, e.g., as schematically illustrated in FIG. 8, which will be described in more detail later on.

It is further appreciated that the noise in decomposed basis images and sinograms is typically highly correlated between the different basis material images. It Is further appreciated that a feature in one of the basis images, such as a region containing iodine, can show up as an artifact in another basis image, such as a bone basis image, if the image reconstruction algorithm Is imperfect. It is therefore important to predict not only the uncertainty of the individual material maps but also the covariance between the different material maps. This can allow the confidence map to be propagated using a formula or algorithm for the propagation of uncertainty to yield an uncertainty map for a derived image, e.g., a virtual non-contrast image, a virtual non-calcium image, a virtual monoenergetic image, or a synthetic Hounsfield unit image.

In a non-limiting embodiment, there is provided a method for generating at least one basis material image together with at least one uncertainty map, where the uncertainty map Is a representation of an uncertainty or error estimate of the basis material image. Such at least one basis material image together with at least one uncertainty map can be presented to a user either as separate images or in combination, for example as a color overlay. Another possibility is to present at least one uncertainty map in the form of a distorting filter for the basis material map, for example by means of a blurring filter.

Figure 9:
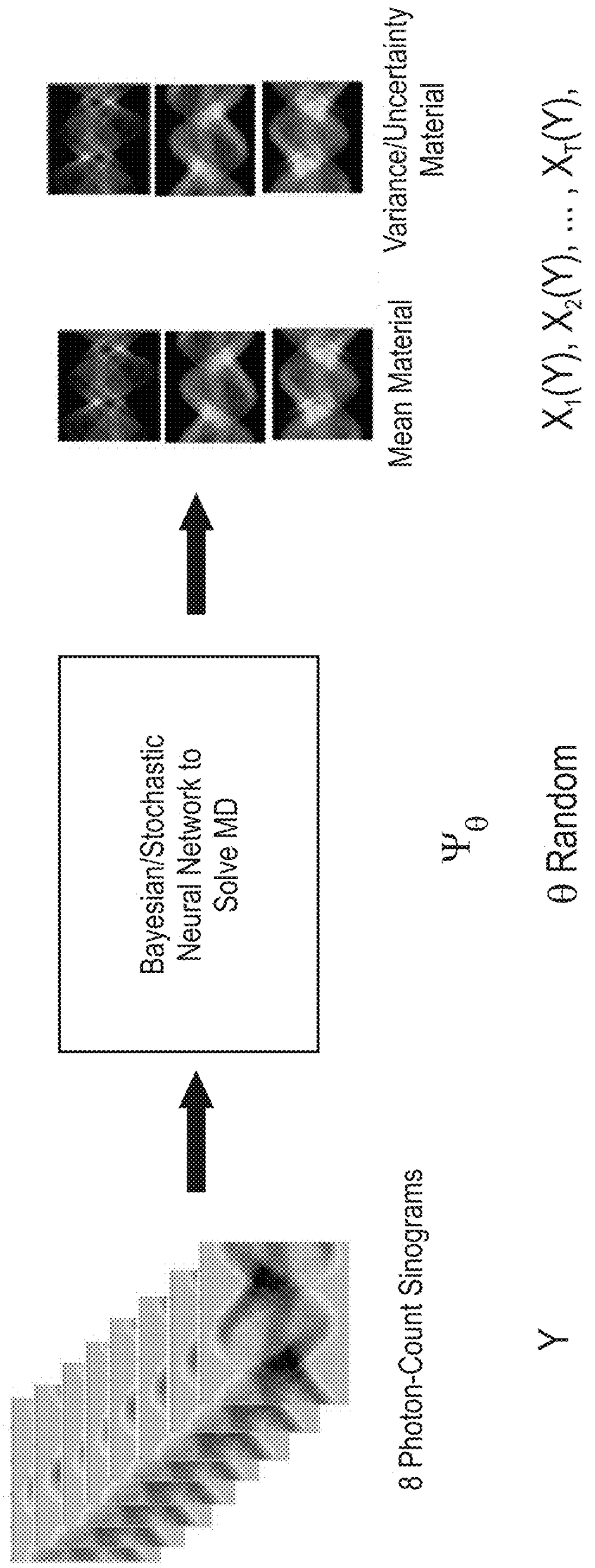
FIG. 9 is a schematic diagram illustrating an example of a Bayesian or stochastic neural network that can be used to solve a material decomposition task or problem.
Figure 10:
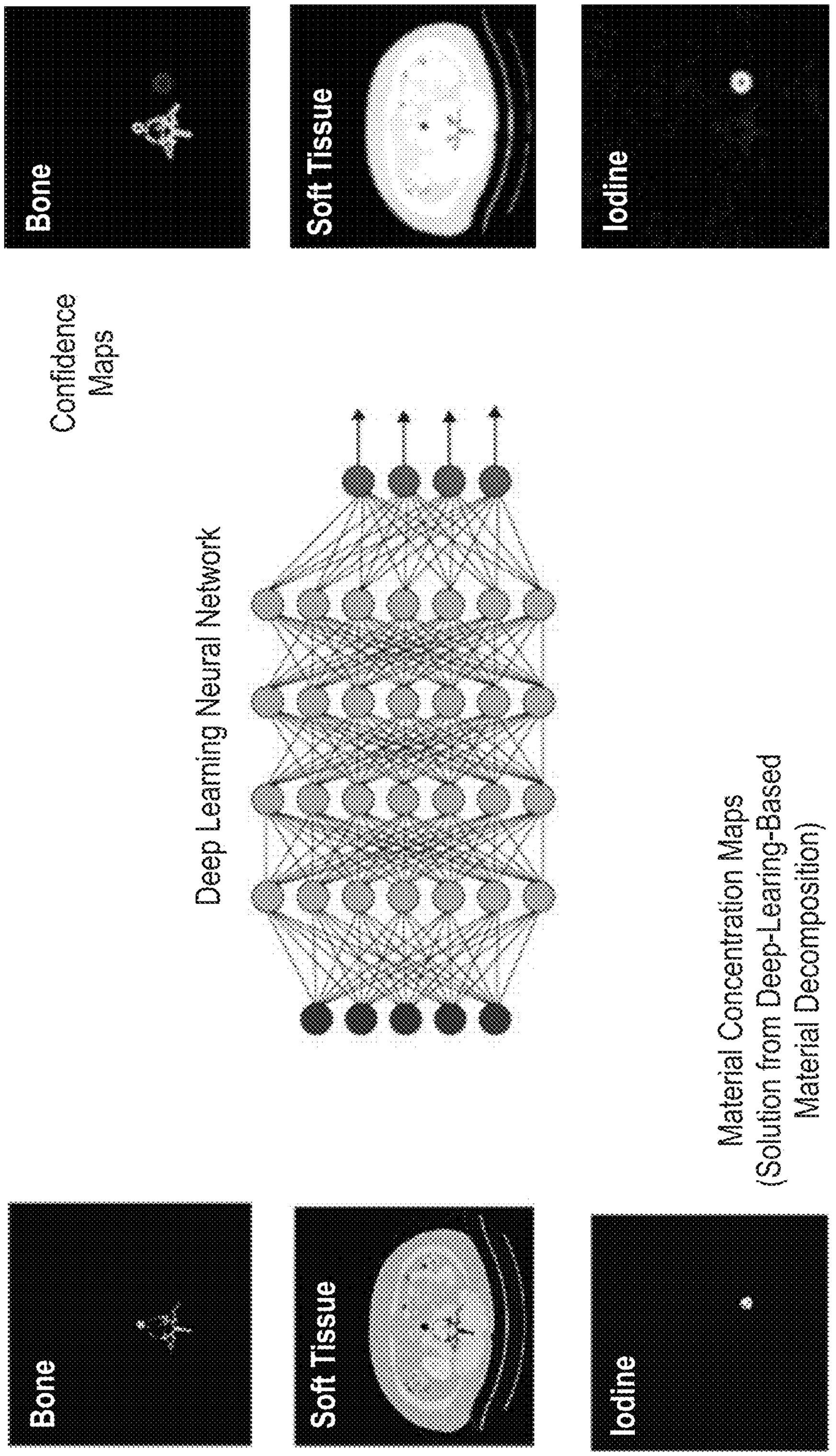
FIG. 10 is a schematic drawing showing how an example of a neural network estimator that takes material concentration maps obtained from deep learning-based material decomposition and generates confidence maps.

FIG. 9 shows a non-limiting example of a stochastic neural network that generates mean material images together with variance maps or uncertainty maps, FIG. 10 shows a deep neural network that maps material concentration maps to uncertainty maps. Such maps can be presented together with the basis material map or separately.

It is also appreciated that generating a highly accurate CT image requires a detector with good energy resolution such as a photon counting detector. It is also appreciated that an accurate physics model can be beneficial for generating a highly accurate CT image from energy-resolved measured data. Such a physics model can be incorporated into a deep learning image processing or reconstruction algorithm, for example by unrolling an iterative optimization loop.

Figure 11:
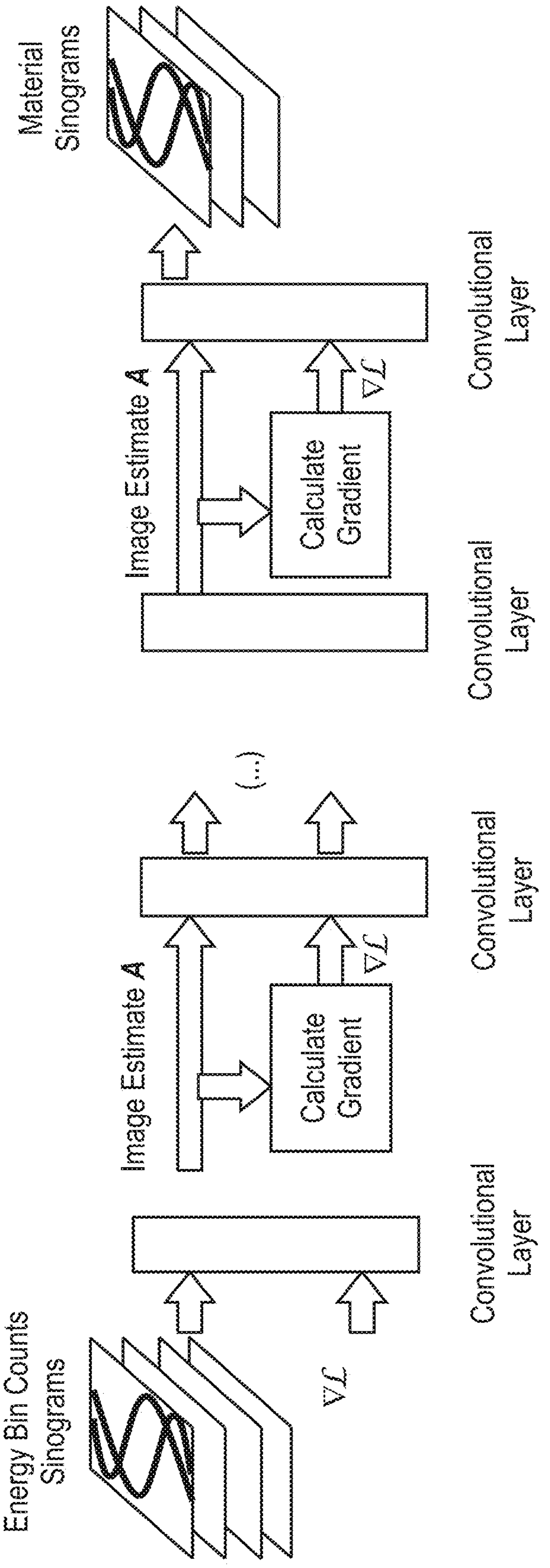
FIG. 11 is a schematic drawing showing a neural network for sinogram-space material decomposition that based on an unrolled iterative material decomposition method.

FIG. 11 shows an exemplary embodiment of such an unrolled iterative loop for sinogram-space basis material decomposition. The input sinogram is thereby processed through a series of neural network blocks, where each block may include one or more neural network layers. As previously described, an energy sinogram may include, e.g., the number of counts measured in a particular energy bin. Each block fakes as its input the output from the preceding block, along with an estimate of the gradient of a target function, for example a likelihood function or log-likelihood function. In one embodiment, this likelihood function can be the likelihood function for detecting a certain combination of measured counts given an estimate of the basis material sinograms. In a preferred embodiment, the layers of the neural network may be layers of a convolutional neural network, i.e., convolutional layers. In a preferred embodiment, the neural network is implemented using graphics processing units (GPUs). It is understood that this is a non-limiting example, and that the network can transform material or energy bin count images to material images, or transform bin counts or material sinograms into material Images by way of projection and backprojection operations inside the neural network.

Apart from the unrolled gradient descent algorithm described above, other iterative algorithms such as a Newton method, a conjugate gradient method, a Nesterov-accelerated method or a primal-dual method can be unrolled, resulting in different network architectures or different functions of the image estimate as inputs to each network layer.

In an exemplary embodiment, the neural network architecture may be based on a material decomposition method taking into account a physical mode! or correction term based on a model of the focal spot shape, the x-ray spectrum shape, charge sharing, scatter in the patient, scatter inside the detector or pile-up. These can lead to different functions being applied to the estimated output at one or more steps inside the neural network.

The combination of photon counting detectors and careful physics modeling can generate highly accurate photon counting images. It is appreciated that the benefit of this high accuracy can be enhanced by providing a reliable error estimate. The proposed technology is based on the insight that spectral CT together with a neural-network-based error estimate can be used to generate highly accurate quantitative images along with error estimates. It is further appreciated that both the image estimate and the uncertainty estimate can be further improved by incorporating at least one model of the physics of the image acquisition.

By way of example, a way of generating an uncertainty map is disclosed. A stochastic neural network, such as a Bayesian neural network can be used to generate samples from the posterior probability distribution of one or more images given the observed/measured data and the training set. By way of example, the training set may include a set of input-output pairs, where each training input is a set of bin sinograms and the training output, or "label", is a set of basis images. Such pairs can for example be generated through simulation of CT imaging of numerical phantoms, or through measurements of physical phantoms with known composition. In another example, such training pairs may be generated by CT imaging of patients, where the training output is obtained as the reconstructed image and the training input can be obtained as the measured sinogram, as a modified sinogram where extra noise has been added, or as a sinogram from another CT acquisition of the same subject acquired with lower dose. By using training inputs with increased noise compared to the training outputs, the resulting trained neural network can achieve the ability to reduce noise, in another embodiment, the input data may be a set of basis sinograms, a set of reconstructed bin images or a set of basis images, in yet another embodiment, the output data bay be a set of basis sinograms, a set of reconstructed bin images or a set of basis images, in this way, neural networks can be constructed that operate either in the sinogram domain or in the image domain, performing either basis decomposition or denoising of basis or bin images or sinograms.

Once trained, the neutral network is ready to process observed/measured data to generate confidence indications such as an uncertainty or confidence map for each considered image during "run-time", e.g., in a clinical setting. This type of neural network provides an output that is a random variable dependent on the input, to the network. By feeding the same data into this network, the posterior probability distribution can be sampled. For example, an uncertainty map can be generated as the standard deviation over many such samples.

Such a neural network that generates an uncertainty map of a basis material image needs to be designed specifically to process multi-energy-channel image and/or sinogram data. Specifically, such a neural network may take as input at least two representations of energy-resolved measured data, for example two energy bin images or two prior decomposed basis material images. Also, such a neural network can generate at least one uncertainty map of at least one basis material image. Such a neural network may process different material maps jointly or separately, or separately for a number of layers and then subsequently jointly for at least one layer.

It is appreciated that a neural network estimator for generating a basis material image or for an uncertainty map or both may incorporate smoothing filters with a tunable filter size in order to adjust the spatial resolution of the resulting images. Such a tunable filter or filters may for example take the form of a Gaussian smoothing in at least one layer. A neural network may be trained to generate a set of images with varying resolution properties when one or more parameters of the tunable filter or filters is varied. After training, the neural network can be used to generate images of varying resolution by adjusting the at least one parameters of the tunable filter. Such a tunable filter may be applied with different filter properties, e.g., kernel size, to different basis material images in order to achieve desired spatial resolution and noise properties in each material image.

A Bayesian neural network can be trained by minimizing the discrepancy between its output distribution given the training input images and the distribution of training output images, also known as training labels. Such a discrepancy can be measured with a mean squared error, a Kuliback-Leibler divergence or a Wasserstein distance. It should be understood that the concepts of "training input images" and "training output images" are non-limiting and refer to representations of image data that can be for example bin images or sinograms or basis images or sinograms.

Figure 13:
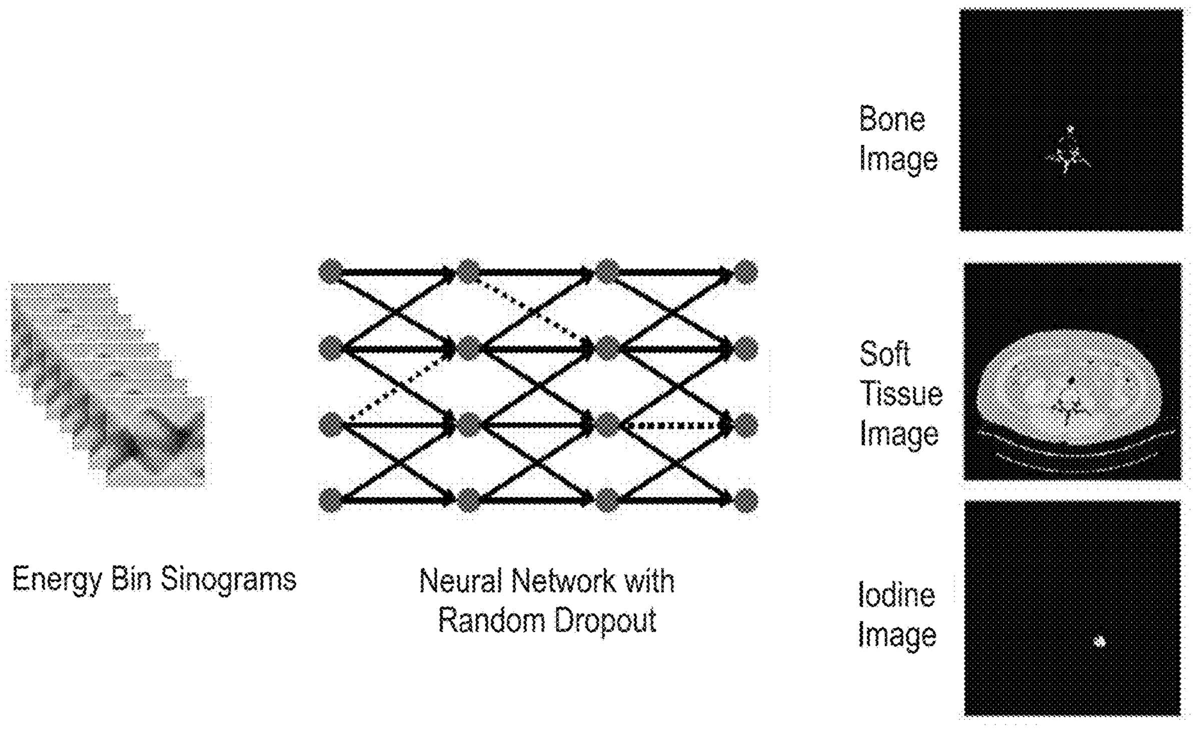
FIG. 13 is a schematic drawing showing an example of a stochastic neural network that takes energy bin sinograms as input and generates reconstructed basis material images based on random dropout.
Figure 14:
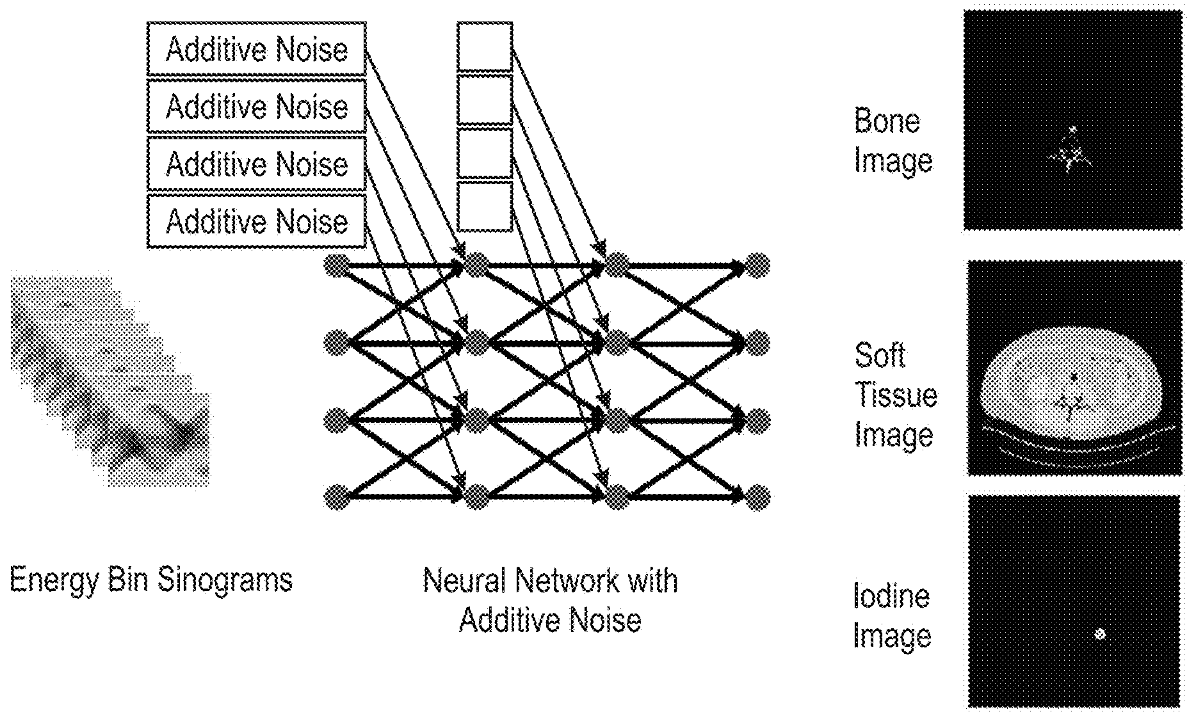
FIG. 14 is a schematic drawing showing an example of a stochastic neural network that takes energy bin sinograms as input and generates reconstructed basis material images based on additive noise insertion.

Such a stochastic neural network can for example be based on random dropout where the network connections with a certain probability that can be fixed or learned from data as is shown in FIG. 13. In another embodiment, the stochastic neural network can be based on additive noise insertion after at least one network layer as is shown in FIG. 14. This additive noise insertion can also be replaced by multiplicative noise insertion or other types of noise insertion.

Figure 15:
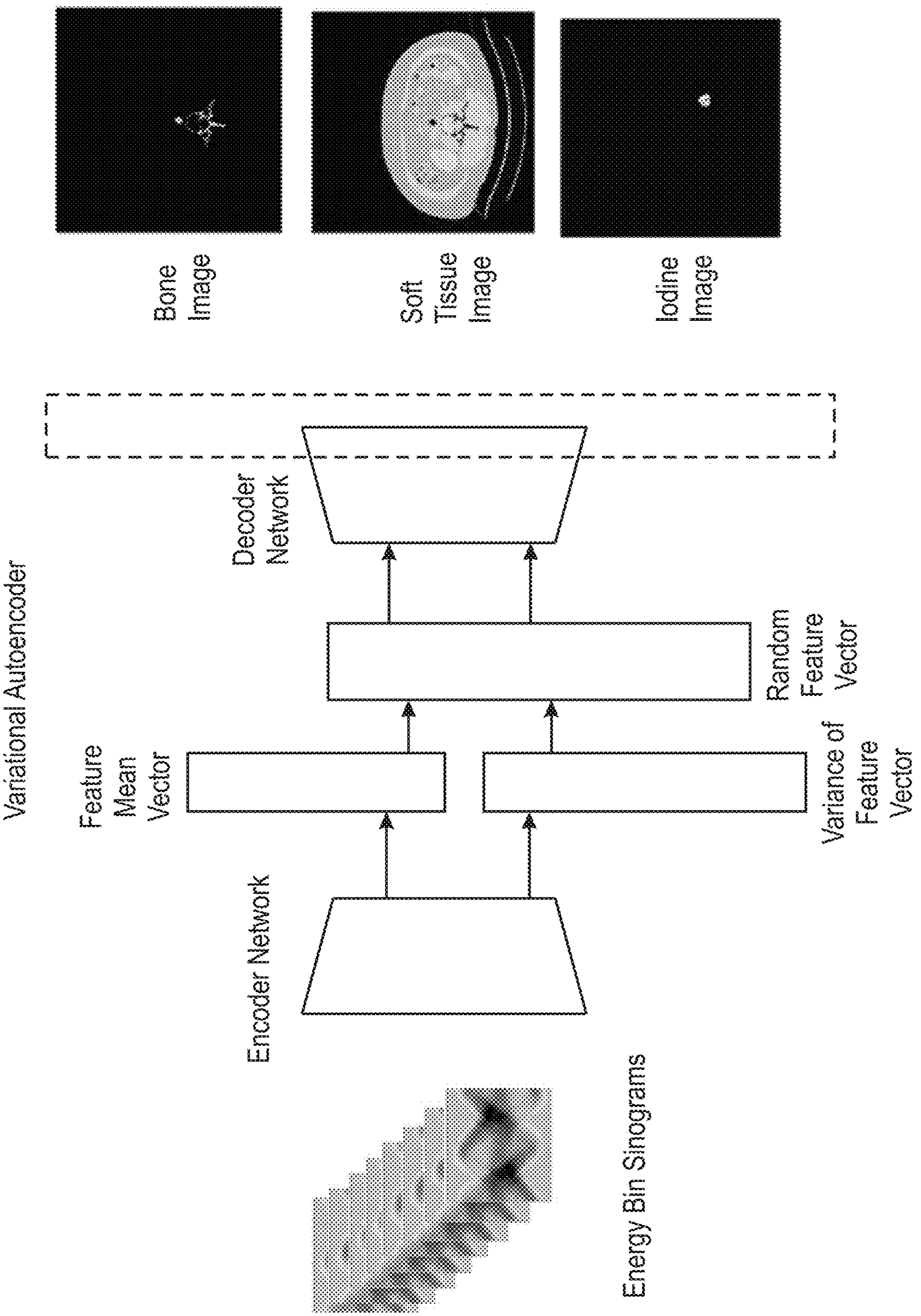
FIG. 15 is a schematic drawing showing an example of a stochastic neural network that takes energy bin sinograms as input and generates reconstructed basis material images based on a variational autoencoder, comprising an encoder, random feature generation and a decoder.

In another embodiment, the stochastic neural network is implemented as a variational autoencoder as is shown in FIG. 15. This variational autoencoder first encodes the data Input vector into parameters of a probability distribution of a latent random variable, such as normal distribution parameters. A collection of posterior samples of the latent variable are then drawn from the latent distribution and processed by the decoder to obtain posterior observations of the result. These posterior observations are used to calculate a posterior mean (final result) and posterior variance (an uncertainty map of the result).

In particular it can be optimal that this discrepancy or loss function used for training the neural network is adapted to the situation in spectral CT material decomposition, by treating the different basis components differently, reflecting their different noise levels and potentially different clinical importance. By way of example, the basis images may be transformed through a change of basis before the data discrepancy Is calculated. For example, the data discrepancy can be calculated by comparing basis images from the training set with basis projections generated as output from the network, in another example, the data discrepancy can he calculated by transforming the basis images to a set of monoenergetic images and then comparing these between the training set and network output. Depending on which type of image is used to calculate the data discrepancy, the performance of the neural network denoising method can be optimized for the type of image that is of interest to show to the end user. In another example, the mathematical function calculating the data discrepancy may weight different linear combinations of the basis images differently, to obtain a larger noise suppression in types of images where low noise is more important compared to types of images where unbiasedness is more important. By way of example, it may be favorable to minimize the noise in a monoenergetic image 70 keV while it is more important to achieve unbiasedness in a map of the effective atomic number in order to characterize the material composition of a sample accurately.

As part of or in addition to generating an uncertainty map, it is possible to use the disclosed method to generate an uncertainty estimate of one or more derived image features, for example a radiomic feature. Examples of such features is the volume of a lesion, the average density of a region, the average effective atomic number of a region, or the standard deviation or another measure of inhomogeneity over a region. To generate an error estimate for such a derived feature, a stochastic neural network may be used to generate a set of image realizations, which can then be used to calculate a number of realizations of the feature. The uncertainty of the feature can then be obtained as for example the standard deviation of these realizations.

For example, accurate basis decomposition with more than two basis functions may be hard to perform in practice, and may result in artifacts, bias or excessive noise. Such a basis decomposition may also require extensive calibration measurements and data preprocessing to yield accurate results. In general, a basis decomposition into a larger number of basis functions may be more technically challenging than decomposition into a smaller number of basis functions.

For example, it may be difficult to perform a calibration that is accurate enough to give a three-basis decomposition with low levels of image bias or artifacts, compared to a two-basis decomposition. Also, it may be difficult to find a material decomposition algorithm that is able to perform three-basis decomposition with highly noisy data without generating excessively noisy basis images, i.e. it may be difficult to attain the theoretical lower limit on basis image noise given by the Cramer-Rao lower bound, while this bound may be easier to attain when performing two-basis decomposition.

As an example, the amount of information needed to generate a larger number of basis image representations may be possible to extract from several sets of basis image representations, each with a smaller number of basis Image representations in each. For example, the information needed to generate a three-basis decomposition into water, calcium, and iodine sinograms may be possible to extract from a set of three two-basis decompositions: a water-calcium decomposition, a water-iodine decomposition and a calcium-iodine decomposition.

It may be easier to perform several two-basis decompositions accurately than a performing a single three-basis decomposition accurately. This observation may be used to solve the problem of, e.g., performing an accurate three-basis decomposition. By way of example, energy-resolved image data may first be used to perform a water-calcium decomposition, a water-iodine decomposition, and a calcium-iodine decomposition. Then, a convolutional neural network may be used to map the resulting six basis images, or a subset thereof, to a set of three output images comprising water, calcium, and iodine images. Such a network can be trained with several two-basis image representation sets as input data and three-basis image representation sets as output data, where the two-basis image representation sets and three-basis image representation sets have been generated from measured patient image data or phantom image data, or from simulated image data based on numerical phantoms.

With the aforementioned method, the bias, artifacts, or noise In the three-basis image representation set can be reduced significantly compared to a three-basis decomposition performed directly on energy-resolved image data. Alternatively, a more high-resolution image can be generated.

As an alternative or complement to a neural network, the machine teaming system or method applied to the original basis images may include another machine learning system or method such as a support vector machine or a decision-tree based system or method.

The basis material decomposition steps used to generate the original basis image representations may include prior information, such as for example volume or mass preservation constraints or nonnegativity constraints. Alternatively, such prior information may take the form of a prior image representation, for example an image from a previous examination or an image reconstructed from aggregate counts in all energy bins, and the algorithm may penalize deviations of the decomposed basis image representation this prior image representation. Another alternative Is to use prior information learned from a set of training images, represented for example as a learned dictionary or a pre-trained convolutional neural network, or a learned subspace, i.e., a subspace of the vector space of possible images, that the reconstructed Image is expected to reside in.

A material decomposition may for example be carried out on projection image data or sinogram data by processing each measured projection ray independently. This processing may take the form of a maximum likelihood decomposition, or a maximum a posteriori decomposition where a prior probability distribution on the material composition in the imaged object is assumed. It may also take the form of linear or affine transform from the set of input counts to the set of output counts, an A-table estimator as exemplarily described by Alvarez (Med Phys. 2011 May; 38(5): 2324-2334), a low-order polynomial approximation e.g. as exemplarily described by Lee et al, (IEEE Transactions on Medical Imaging (Volume: 36, Issue: 2, February 2017: 560-573), a neural network estimator as exemplarily described by Alvarez (https://arxiv.org/abs/1702.01006) or a look-up table. Alternatively, a material decomposition method may process several rays jointly, or comprise a one-step or two-step reconstruction algorithm. An article by Chen and Li in Optical Engineering 58(1), 013104 discloses a method for performing multi-material decomposition of spectral CT data using deep neural networks.

An article by Poirot et al. in Scientific Reports volume 9, Article number: 17709 (2019) discloses a method of generating non-contrast single-energy CT images from dual-energy CT images using a convolutional neural network.

FIG. 8 is a schematic diagram illustrating an example of an uncertainty map according to an embodiment. Whereas the iodine map shows the estimate of the iodine concentration, with regions of high intensity containing a large concentration of iodine, the iodine confidence maps shows the confidence with which the algorithm can predict that there is iodine in each given pixel of the image. The resulting image highlights regions where there is iodine with high probability whereas dark regions are areas where there is most likely no iodine present.

FIG. 9 is a schematic diagram illustrating an example of a Bayesian or stochastic neural network that can be used to solve a material decomposition problem. This exemplifying neural network takes eight energy bin sinograms as input and generates a number T of material sinograms as output. The neural network is represented by a mapping $\psi_\theta$ where $\theta$ is a random parameter vector. Since this mapping depends on a random parameter, applying the network to the same input data multiple times will give different outputs. The mean of such an ensemble of outputs is then used as an estimate of a material map, whereas the variance us used as an estimate of an uncertainty map.

FIG. 10 is a schematic drawing showing how an example of a neural network estimator that takes material concentration maps obtained from deep learning-based material decomposition and generates confidence maps. These confidence maps highlight areas of the images where if is highly likely that bone, soft tissue and iodine, respectively, are present. As can be seen in the images, the iodine confidence map highlights the area where there is a tumor taking up iodine but also attaches a low but nonzero value to the spine region since the algorithm cannot rule out completely that there Is iodine in this region. The application of the neural network to material concentration maps obtained from deep learning-based material decomposition is exemplary, and In another embodiment, the neural network can be applied to images reconstructed using other methods, such as filtered backprojection.

FIG. 11 is a schematic drawing showing a neural network for sinogram-space material decomposition that based on an unrolled iterative material decomposition method. This method is based on an iterative denoising method with a pre-defined number of iterations where the update step in each iteration has been replaced with a neural network. In this exemplary embodiment, a gradient-descent algorithm has been unrolled, meaning that a gradient is calculated at each iteration step and taken as an additional input to the next network, thereby providing the network with information about the physics and statistics models underlying the denoising.

Figure 12:
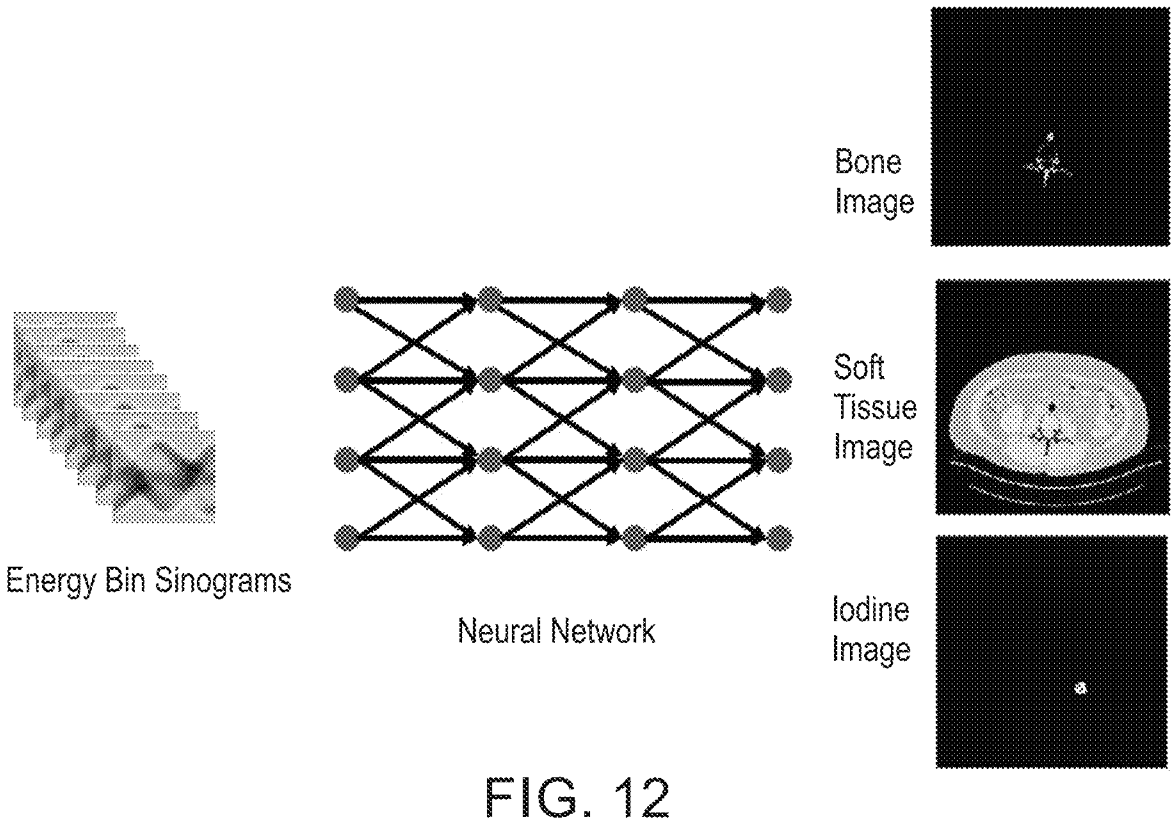
FIG. 12 is a schematic drawing showing an example of a neural network that takes energy bin sinograms as input and generates reconstructed basis material images.

FIG. 12 is a schematic drawing showing an example of a neural network that takes energy bin sinograms as input and generates reconstructed basis material images. By way of example, a detector that generates eight energy bin sinograms can be used, and these are provided to the neural network as eight Input channels. The three output channels in this example correspond to the three basis images: bone, soft tissue, and iodine.

FIG. 13 is a schematic drawing showing an example of a stochastic neural network that takes energy bin sinograms as input and generates reconstructed basis material images based on random dropout. Each time the network is applied to a set of input sinograms, a random selection of the network weights are randomly set to zero, giving a random network output.

FIG. 14 is a schematic drawing showing an example of a stochastic neural network that takes energy bin sinograms as input and generates reconstructed basis material images based on additive noise insertion. By adding a noise values to the nodes at each layer of the network, the output basis images will become a random function of the input bin sinograms, in this way, applying the network to the same input image multiple times can give a random distribution of output images, and the network can be trained in such a way that this distribution agrees with the posterior distribution of images given the input data.

FIG. 15 is a schematic drawing showing an example of a stochastic neural network that takes energy bin sinograms as input and generates reconstructed basis material images based on a variational autoencoder, comprising an encoder, random feature generation and a decoder. The encoder part translates the energy bin sinograms to a feature mean vector and a variance vector. These vectors are then used as parameters in order to randomly generate a random feature vector. This vector can for example be selected as a sample from a multivariate normal distribution with the mean and variance given by the output vectors from the encoder part. The random feature vector is taken as input to a decoder network, generating bone, soft tissue and iodine basis images. In this way, the entire variational autoencoder works as a stochastic neural network that maps the input sinograms to a set of output basis images, where these output images are not deterministic but sampled from a statistical distribution. The network can be trained in such a way that this distribution agrees with the posterior distribution of images given the input data.

Some non-limiting exemplifying features of mapping uncertainty with deep neural networks may include the neural network learns to approximate the posterior probability distribution of the solution. The neural network acts as a random function. This means that with the same observation "y" (network input) the network can provide K differently drawn solutions (network outputs, $x_1, x_2, \ldots, x_K$).

In a Bayesian Network, this is achieved, for example, with random dropouts.

In variational encoder post-processing, there is a random latent parameter z.

In a generative network, there is a random input parameter z.

In order to learn the posterior probability distribution of the solution, statistical distances are used in the training loss on the neural networks (KL divergences, Wasserstein distances, and so forth).

According to a second main aspect, there is provided a non-limiting example of a corresponding system for determining a confidence indication for machine learning image reconstruction such as deep learning image reconstruction in Computed Tomography (CT), The system for determining a confidence indication is configured to acquire energy-resolved x-ray data. The system is further configured to process the energy-resolved x-ray data based on at least one machine learning system, such as one or more neural networks, to obtain a representation of a posterior probability distribution of at least one reconstructed basis image or image feature thereof. The system is also configured to generate one or more confidence indications for: the at least one reconstructed image, or at least one derivative image originating from the at least one reconstructed basis image, or image feature of the at least one reconstructed basis image or the at least one derivative image, based on the representation of a posterior probability distribution.

As mentioned, the machine learning image reconstruction may be, e g., deep-learning image reconstruction, and the at least one machine learning system may include at least one neural network.

By way of example, the one or more confidence indications may include an error estimate or measure of statistical uncertainty for at least one point in the at least one reconstructed basis image, and/or an error estimate or measure of statistical uncertainty for at least one image measurement derivable from the at least one reconstructed basis image.

Optionally, the system may be configured to generate the one or more confidence indications in the form of one or more uncertainty maps for: the at least one reconstructed basis image, or at least one derivative image originating from the at least one reconstructed basis image, or the image feature thereof.

In a particular example, the system may be configured to generate the one or more confidence indications in the form of a confidence map for a reconstructed material-selective x-ray image for Computed Tomography, CT.

As an example, the system is further configured to perform material-decomposition-based image reconstruction and/or machine learning image reconstruction based on energy bin sinograms as input to generate the at least one reconstructed basis image or image feature thereof.

Optionally, the system may be configured to generate the confidence map so as to highlight parts of the reconstructed material-selective x-ray image that the machine learning image reconstruction has been able to determine with a confidence level above a threshold.

According to a complementary aspect, there is provided a non-limiting example of a corresponding system for generating an uncertainty map for machine learning image reconstruction such as deep learning image reconstruction in spectral CT. The system for generating an uncertainty map is configured to obtain energy-resolved x-ray data. The system is further configured to process the energy-resolved x-ray data based on at least one machine learning system such as one or more neural networks such that a representation of a posterior probability distribution of at least one basis image, or image feature thereof, is obtained. The system is also configured to generate one or more uncertainty maps for at least one reconstructed image, or derivative image, or image feature thereof, based on the representation of a posterior probability distribution.

According to an additional aspect, there is provided a corresponding image reconstruction system comprising such a system for determining a confidence indication and/or such a system for generating an uncertainty map for deep learning image reconstruction.

According to another aspect, there is provided an overall x-ray imaging system comprising such an image reconstruction system.

According to yet another aspect, there is provided corresponding computer programs and computer program products.

In an exemplary embodiment, the step or configuration of acquiring or obtaining of energy-resolved x-ray (image) data is done by way of a CT imaging system.

In an exemplary embodiment, the step or configuration of acquiring or obtaining energy-resolved x-ray (image) data is done by way of an energy resolving photon counting detector, also referred to as a multi-bin photon counting x-ray detector.

Alternatively, the step or configuration of acquiring or obtaining energy-resolved x-ray (image) data is done by way of a multi x-ray-tube acquisition, a slow or fast kV-switching acquisition, a multi-layer detector or a split-filter acquisition.

In an exemplary embodiment, the machine learning involves a machine learning architecture and/or algorithm, which may be based on a convolutional neural network. Alternatively, the machine learning architecture and/or algorithm may be based on a support vector machine or a decision-tree based method.

In an exemplary embodiment, the convolutional neural network may be based on a residual network (ResNet), residual encoder-decoder, U-Net, AlexNet or LeNet architecture Alternatively, the machine learning algorithm based on a convolutional neural network may be based on an unrolled optimization method based on gradient descent algorithm, a primal-dual algorithm or an alternating direction method of multipliers (ADMM) algorithm.

In an exemplary embodiment, the convolutional neural network includes at least one forward projection or at least one backprojection as part of the network architecture.

For a better understanding, illustrative and non-limiting examples of the proposed technology will now be described.

By way of example, it is possible to determine a confidence indication such as an uncertainty or confidence map by introducing a separate machine learning based estimator to generate an estimate of, e.g., the bias, variance and/or covariance of the different reconstructed basis images. These can then be propagated to yield uncertainty maps for any derivative image(s), such as virtual monoenergetic or virtual non-contrast images.

There are different ways to generate these maps. One way is based on bootstrapping, by training neural networks to resampled training datasets. For example, a random set of training samples, each comprising input and output training data, can be sampled with replacement and used to train a neural network. By repeating this procedure, an ensemble of neural networks can be obtained, and by processing input image data using each of these networks, an ensemble of output Images or output image data representations can be obtained. The variation or uncertainty within this ensemble of output images can be measured, for example as the pixel-wise standard deviation over the distribution of images. A second neural network can then be trained to map the measured image data to the resulting uncertainty or the resulting distribution of image values. However, a less computationally demanding method is based on variational autoencoders. This neural network architecture, which maps the data to a low-dimensional feature space at an intermediate layer, can be trained to sample the posterior probability distribution of the image results of a machine learning image reconstruction procedure such as deep learning reconstruction method under study. A posterior probability distribution for the low-dimensional intermediate latent feature of the variational autoencoder can be found from the encoder function. Then, the decoder may be used to find the corresponding posterior probability distribution of the reconstructed image.

One way of representing a probability distribution is to provide random samples, also known as Monte Carlo samples, from the distribution.

One way of processing an image representation to obtain a representation of a probability distribution is by applying a stochastic neural network to the image representation. A stochastic neural network is a neural network that contains random elements or components such that the output will be a random function for which the probability distribution depends on the input.

By way of example, the stochastic neural network can provide one or more Monte Carlo samples of a probability distribution. in another exemplary embodiment, a deterministic neural network can be trained to provide a measure of the probability distribution of a posterior random variable, for example an image or an image feature.

For example, the measure of the probability distribution of a posterior random variable can be a mean variance, a covariance, a standard deviation, a skewness, a kurtosis, or a combination of these.

For example, a statistical estimator for image uncertainty or a posterior probability distribution, such as a Monte Carlo estimator, a Markov Chain Monte Carlo estimator, a bootstrap estimator or a stochastic neural network estimator can be created initially and subsequently used to generate training data for training a deterministic neural network to predict one or more measures of the posterior probability distribution.

By way of example, the basis image can be a map of the density of a physical material such as water, soft tissue, calcium, iodine, gadolinium or gold. A basis image can also be a map of an imaginary or virtual material, for example representing a physical property, such as a map of the Compton scatter cross-section, photoelectric absorption cross-section, density or effective atomic number.

For example, the confidence indication can be an error estimate or measure of statistical uncertainty for at least one point in one or more reconstructed images. The confidence indication can also be an error estimate or a measure of statistical uncertainty for at least one image measurement that can be derived from at least one image.

For example, an error estimate or measure of statistical uncertainty can be an upper bound for an error, a tower bound for an error, a standard deviation, a variance or a mean absolute error.

For example, an image measurement that can be derived from at least one image can be a dimensional measure of a feature, an area, a volume, a degree of inhomogeneity, a measure of shape or irregularity, a measure of composition or a measure of concentration of a substance.

For example, an Image measurement that can be derived from at least one image can be a radiomic feature, for example a standardized radiomic feature.

In an exemplary embodiment, processing of energy-resolved x-ray data includes forming at least one basis sinogram or reconstructed basis image and processing the image based on a neural network.

For example, a neural network can be a convolutional neural network.

For example, in order to allow sufficient flexibility in fitting to training data, a neural network can be a deep neural network with at least five layers.

By way of example, methods of estimating an error map may include Markov Chain Monte Carlo or approximate Bayes estimators based on variational dropout.

The article "Uncertainty modelling in deep learning for safer neuroimage enhancement-. Demonstration in diffusion MRI" by Tanno et al. in Neuroimage 225, Oct. 9, 2020 relates to a method using a Bayesian Neural Network with variational dropout to generate an uncertainty map for enhancing diffusion magnetic resonance image images.

The article "Uncertainty Quantification in Deep MR! Reconstruction" by Edupuganti et al. in IEEE Transactions on Medical Imaging, Vol. 40, No. 1, January 2021 relates to a method of using a variational autoencoder as a post-processing step that generates posterior samples of the result and constructs with those an uncertainty map for magnetic resonance image (MRI) reconstructions from undersampled data. However, the authors require a pre-processed reconstruction that is calculated without deep learning, and further relates to MRI.

The article "Deep posterior sampling: Uncertainty quantification for large scale inverse problems" (Medical Imaging with Deep Learning 2019) by Adler and Oktem relates to a method of quantifying the uncertainty in x-ray computed tomography images considering a post-processing generative neural network that samples the posterior probability distribution of the result. However, the authors require a pre-processed reconstruction, and the article does not disclose a way of quantifying the error in specific material density maps. The article further relates to MRI.

US 20200294284A1 relates to a method of generating uncertainty information about a reconstructed image. However, the article does not disclose a way of quantifying the error in specific material density maps, and considers energy-integrating CT without any energy-resolved data whatsoever. This further means that it is not possible to effectuate material basis decomposition to generate basis images.

The approach of the present application primarily considers energy-resolved (spectral) CT with multi-energy and multi-material results.

By way of example, photon counting CT implies a higher dimensionality problem, where a good scaling is required, and cross-material and cross-energy information impact the posterior samplings.

The three articles above are based on post-processing neural networks that do not solve the reconstruction problem with deep learning.

With the proposed technology, basis image reconstruction and uncertainty mapping can be solved with machine learning such as deep learning.

It will be appreciated that the mechanisms and arrangements described herein can be implemented, combined and re-arranged in a variety of ways.

For example, embodiments may be implemented in hardware, or at least partly in software for execution by suitable processing circuitry, or a combination thereof.

The steps, functions, procedures, and/or blocks described herein may be Implemented in hardware using any conventional technology, such as discrete circuit or integrated circuit technology, including both general-purpose electronic circuitry and application-specific circuitry.

Alternatively, or as a complement, at least some of the steps, functions, procedures, and/or blocks described herein may be implemented in software such as a computer program for execution by suitable processing circuitry such as one or more processors or processing units.

This could for example be implemented as part of a computer-based image reconstruction system.

Figure 16:
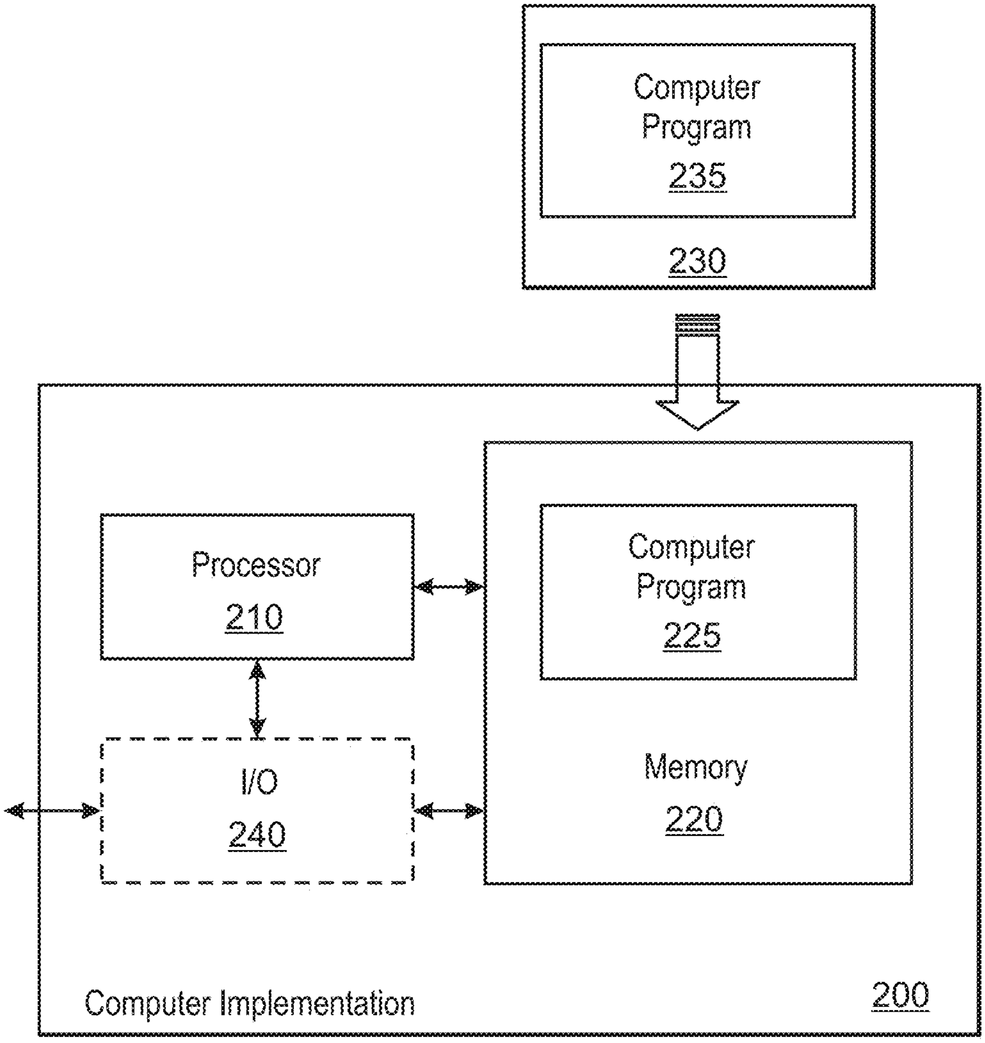
FIG. 16 is a schematic diagram illustrating an example of a computer implementation according to an embodiment.

FIG. 16 is a schematic diagram illustrating an example of a computer implementation according to an embodiment. In this particular example, the system 200 comprises a processor 210 and a memory 220, the memory comprising instructions executable by the processor, whereby the processor is operative to perform the steps and/or actions described herein. The instructions are typically organized as a computer program 225; 235, which may be preconfigured in the memory 220 or downloaded from an external memory device 230. Optionally, the system 200 comprises an input/output Interface 240 that may be interconnected to the processor(s) 210 and/or the memory 220 to enable input and/or output of relevant data such as Input parameter(s) and/or resulting output parameter(s).

In a particular example, the memory comprises such a set of instructions executable by the processor, whereby the processor is operative to generate a confidence indication such as an uncertainty map for deep learning based image reconstruction in CT imaging.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

The proposed technology also provides a computer-program product comprising a computer-readable medium 220; 230 having stored thereon such a computer program.

By way of example, the software or computer program 225; 235 may be realized as a computer program product, which is normally carried or stored on a computer-readable medium 220; 230, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Method flows may be regarded as a computer action flows, when performed by one or more processors. A corresponding device, system and/or apparatus may be defined as a group of function modules, where each step performed by the processor corresponds to a function module. In this case, the function modules are implemented as a computer program running on the processor. Hence, the device, system and/or apparatus may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein.

Alternatively, it is possible to realize the modules predominantly by hardware modules, or alternatively by hardware. The extent of software versus hardware is purely implementation selection.

Embodiments of the present disclosure shown in the drawings and described above are example embodiments only and are not intended to limit the scope of the appended claims, including any equivalents as included within the scope of the claims. Various modifications are possible and will be readily apparent to the skilled person in the art. It is intended that any combination of non-mutually exclusive features described herein are within the scope of the present invention. That is, features of the described embodiments can be combined with any appropriate aspect described above and optional features of any one aspect can be combined with any other appropriate aspect. Similarly, features set forth in dependent claims can be combined with non-mutually exclusive features of other dependent claims, particularly where the dependent claims depend on the same independent claim. Single claim dependencies may have been used as practice in some jurisdictions require them, but this should not be taken to mean that the features in the dependent claims are mutually exclusive.

The invention claimed is:

1. A method for determining one or more confidence indications for machine learning image reconstruction in the computed tomography (CT), the method comprising:

acquiring energy-resolved x-ray data, using an energy discriminating x-ray detector;

performing material decomposition-based image reconstruction by machine learning image reconstruction to generate at least one reconstructed basis image or image feature thereof based on the acquired energy-resolved x-ray data;

processing the energy resolved x-ray data based on at least one machine learning system to generate a representation of a posterior probability distribution of the at least one reconstructed basis image or image feature thereof; and generating one or more confidence indications for the at least one reconstructed basis image, or at least one derivative image originating from the at least one reconstructed basis image, or image feature of the at least one reconstructed basis image or the at least one derivative image, based on the representation of a posterior probability distribution;

wherein the step of generating one or more confidence indications comprises determining an uncertainty or confidence map of individual basis material images and also covariance between different basis material images, allowing the uncertainty or confidence map to be propagated to yield an uncertainty map for a derived image.

2. The method of claim 1, wherein the machine learning image reconstruction is deep learning image reconstruction, and the at least one machine learning system includes at least one neural network.

3. The method of claim 1, wherein the representation of a posterior probability distribution includes at least one of a mean variance, a covariance, a standard deviation, a skewness, and a kurtosis.

4. The method of claim 1, wherein the one or more confidence indications includes an error estimate or measure of statistical uncertainty for at least one point in the at least one reconstructed basis image, and/or an error estimate or measure of statistical uncertainty for at least one image measurement derivable from the at least one reconstructed basis image.

5. The method of claim 4, wherein the error estimate or measure of statistical uncertainty includes at least one of an upper bound for an error, a lower bound for an error, a standard deviation, a variance, or a mean absolute error.

6. The method of claim 4, wherein the at least one image measurement comprises at least one of the following: a dimensional measure of a feature, an area, a volume, a degree of inhomogeneity, a measure of shape or irregularity, a measure of composition, and a measure of concentration of a substance.

7. The method of claim 1, wherein the one or more confidence indications includes one or more uncertainty maps for the at least one reconstructed basis image, or at least one derivative image originating from the at least one reconstructed basis image, or the image feature thereof.

8. The method of claim 1, wherein the step of generating one or more confidence indications comprises generating a confidence map for a reconstructed material selective x-ray image for CT.

9. The method of claim 8, wherein the confidence map is generated to highlight parts of the reconstructed material selective x-ray image that the machine learning image reconstruction has been able to determine with a confidence level above a given threshold.

10. The method of claim 1, wherein the step of generating one or more confidence indications comprises generating, by a neural network taking material concentration maps obtained from deep learning based material decomposition as input, one or more confidence maps.

11. The method of claim 10, wherein the step of performing material-decomposition-based image reconstruction and/or machine learning image reconstruction comprises generating, by a neural network taking energy bin sinograms as input, the at least one reconstructed basis image or image feature.

12. The method of claim 1, wherein at least one basis material image is generated together with at least one uncertainty map, wherein the uncertainty map is a representation of an uncertainty or error estimate of the at least one basis material image, and wherein the at least one basis material image and the at least one uncertainty map are presentable to a user as separate images or in combination.

13. The method of claim 12, wherein the at least one uncertainty map is presentable as an overlay relative to the at least one basis material image or wherein the at least one uncertainty map is presentable by a distorting filter for the at least one basis material image.

14. The method of claim 1, wherein the step of processing the energy resolved x-ray data based on at least one machine learning system to generate a representation of a posterior probability distribution comprises generating, by a neural network, samples of the posterior probability distribution given acquired energy-resolved x-ray data, and wherein the step of generating one or more confidence indications comprises generating an uncertainty map as the standard deviation over a plurality of samples.

15. The method of claim 1, wherein the step of processing the energy resolved x-ray data based on at least one machine learning system to generate a representation of a posterior probability distribution comprises applying a neural network, implemented as a variational autoencoder, to encode an input data vector into parameters of a probability distribution of a latent random variable, and extract a collection of posterior samples of the latent random variable from this probability distribution for processing by a corresponding decoder to obtain posterior observations.

16. The method of claim 1, wherein the step of generating one or more confidence indications comprises generating at least one map of the variance or standard deviation of at least one basis coefficient and/or at least one map of the covariance or correlation coefficient of at least one pair of basis functions associated with the at least one reconstructed basis image.

17. The method of claim 1, wherein the representation of a posterior probability distribution is specified by the mean and variance of a plurality of image features.

18. A system for determining one or more confidence indications for machine learning image reconstruction in CT, wherein the system is configured to acquire energy resolved x-ray data using an energy discriminating x-ray detector;

wherein the system is further configured to perform material-decomposition-based image reconstruction by means of machine learning image reconstruction based on the energy-resolved x-ray data including energy bin sinograms as input to generate at least one reconstructed basis image or image feature thereof;

wherein the system is further configured to process said energy-resolved x-ray data based on at least one machine learning system to obtain a representation of a posterior probability distribution of the at least one reconstructed basis image or image feature thereof;

wherein the system is also configured to generate one or more confidence indications for the at least one reconstructed basis image, or at least one derivative image originating from the at least one reconstructed basis image, or image feature of the at least one reconstructed basis image or the at least one derivative image, based on the representation of a posterior probability distribution; and wherein the system is configured to determine an uncertainty or confidence map of individual basis material images and also covariance between different basis material images, allowing the uncertainty or confidence map to be propagated to yield an uncertainty map for a derived image.

19. The system of claim 18, wherein the machine learning image reconstruction is deep learning image reconstruction, and the at least one machine learning system includes at least one neural network.

20. The system of claim 18, wherein the one or more confidence indications includes an error estimate or measure of statistical uncertainty for at least one point in the at least one reconstructed basis image, and/or an error estimate or measure of statistical uncertainty for at least one image measurement derivable from the at least one reconstructed basis image.

21. The system of claim 18, wherein the system is configured to generate the one or more confidence indications in the form of one or more uncertainty maps for the at least one reconstructed basis image, or at least one derivative image originating from the at least one reconstructed basis image, or the image feature thereof.

22. The system of claim 18, wherein the system is configured to generate the one or more confidence indications in the form of a confidence map for a reconstructed material selective x-ray image for CT.

23. The system of claim 18, wherein the system is configured to generate the confidence map so as to highlight parts of the reconstructed material selective x-ray image that the machine learning image reconstruction has been able to determine with a confidence level above a threshold.

* * * * *